United States Patent [19]
Hirai et al.

[11] Patent Number: 5,137,653
[45] Date of Patent: Aug. 11, 1992

[54] ALKANOYL ESTER COMPOUNDS AND THEIR INTERMEDIATES AND METHOD OF PRODUCING THE SAME

[75] Inventors: Toshihiro Hirai; Atsushi Yoshizawa; Isa Nishiyama; Mitsuo Fukumasa; Nobuyuki Shiratori; Akihisa Yokoyama, all of Toda, Japan

[73] Assignee: Nippon Mining Co., Ltd., Japan

[21] Appl. No.: 778,757

[22] Filed: Oct. 18, 1991

Related U.S. Application Data

[63] Continuation of Ser. No. 280,721, filed as PCT JP/88/00334 or Mar. 31, 1988, abandoned.

[30] Foreign Application Priority Data

| Mar. 31, 1987 | [JP] | Japan | 62-75918 |
| Mar. 31, 1987 | [JP] | Japan | 62-75919 |
| Apr. 21, 1987 | [JP] | Japan | 62-96218 |
| Apr. 21, 1987 | [JP] | Japan | 62-96219 |
| Aug. 21, 1987 | [JP] | Japan | 62-206384 |
| Nov. 24, 1987 | [JP] | Japan | 62-293999 |
| Nov. 24, 1987 | [JP] | Japan | 62-294000 |
| Nov. 24, 1987 | [JP] | Japan | 62-294001 |
| Nov. 24, 1987 | [JP] | Japan | 62-294002 |
| Nov. 24, 1987 | [JP] | Japan | 62-294003 |
| Feb. 2, 1988 | [JP] | Japan | 63-21381 |

[51] Int. Cl.$^5$ .............. C09K 19/12; C09K 19/20; C07C 69/76
[52] U.S. Cl. .............. 252/299.65; 252/299.67; 560/55; 560/59; 560/61; 560/64; 560/73; 560/102; 560/106; 560/107; 560/108; 560/109
[58] Field of Search ......... 252/299.01, 299.65, 252/299.67; 560/55, 59, 61, 64, 73, 102, 106, 107, 108, 109

[56] References Cited

U.S. PATENT DOCUMENTS

| 4,668,427 | 5/1987 | Saito et al. | 252/299.66 |
| 4,780,242 | 10/1988 | Miyazawa et al. | 252/299.65 |
| 4,886,623 | 12/1989 | Mitsuhashi et al. | 252/299.65 |
| 5,049,308 | 9/1991 | Mitsuhashi et al. | 252/299.67 |

FOREIGN PATENT DOCUMENTS

| 0131373 | 1/1985 | European Pat. Off. . |
| 136725 | 4/1985 | European Pat. Off. ...... 252/299.65 |
| 2644219 | 4/1978 | Fed. Rep. of Germany ... 252/299.6 |
| 61-43 | 1/1986 | Japan . |
| 61-22051 | 1/1986 | Japan . |
| 1453463 | 10/1976 | United Kingdom . |
| 2199826 | 7/1988 | United Kingdom . |

OTHER PUBLICATIONS

M. B. Hocking et al., "Steric and pH Effects on the Rate of Dakin Oxidation of Acylphenols", Journal of Organic Chemistry, vol. 47, No. 22, pp. 4208-4215, Oct. 22, 1982.

Y. Kamitori et al., "Sodium Sulfide as a Selective Reducing Reagent for Aldehydes to Alcohols. Use of Alumina as an Effective Catalyst", Chemistry Letters, No. 2, pp. 253-254, 1985.

*Primary Examiner*—Robert L. Stoll
*Assistant Examiner*—Philip Tucker
*Attorney, Agent, or Firm*—Parkhurst, Wendel & Rossi

[57] ABSTRACT

This invention provides a novel alkanoyl ester compound represented by general formula (I):

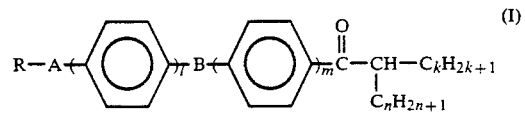

(wherein A is of —, —O—,

B is (Abstract continued on next page.)

l and m are 1 or 2 provided that both are not simultaneously 2, k and n are an integer of 1 or more, respectively, provided that k>n, and R is an alkyl group), a liquid crystal composition containing this compound, a novel alkanoylphenyl compound or a novel alkanoylbiphenyl compound as an intermediate for the production of the above compound, and a method of producing the same. These novel alkanoyl ester compounds are excellent in the stability against light and the like and can take a liquid crystal state at a wide temperature range. Particularly, these compounds form liquid crystals of ferroelectricity having a large spontaneous polarization and a fast response rate by introducing an optically active group into the compound, so that they develop a very excellent effect as a starting material for optoelectronics and its related elements.

3 Claims, 3 Drawing Sheets

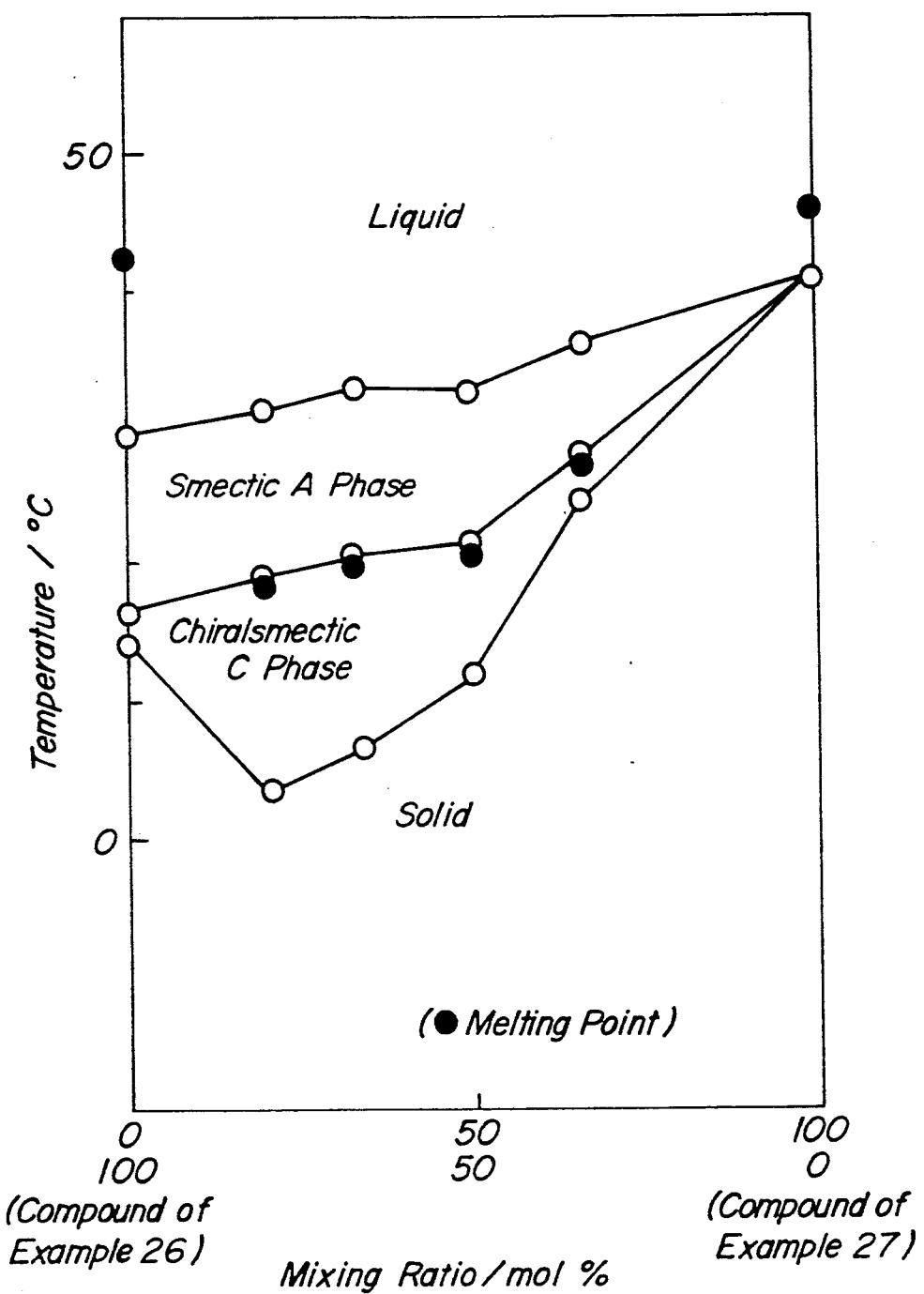

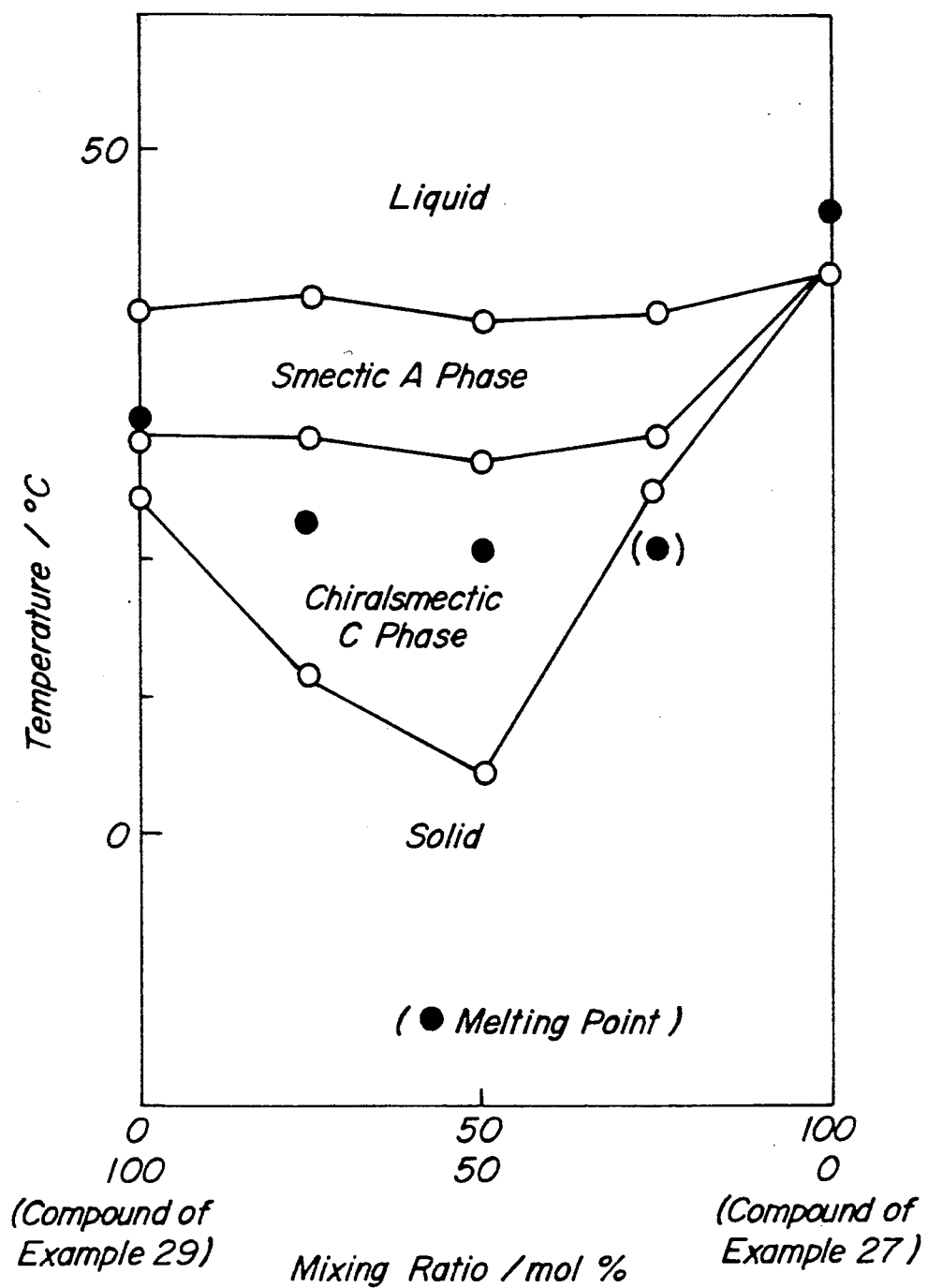
FIG._2

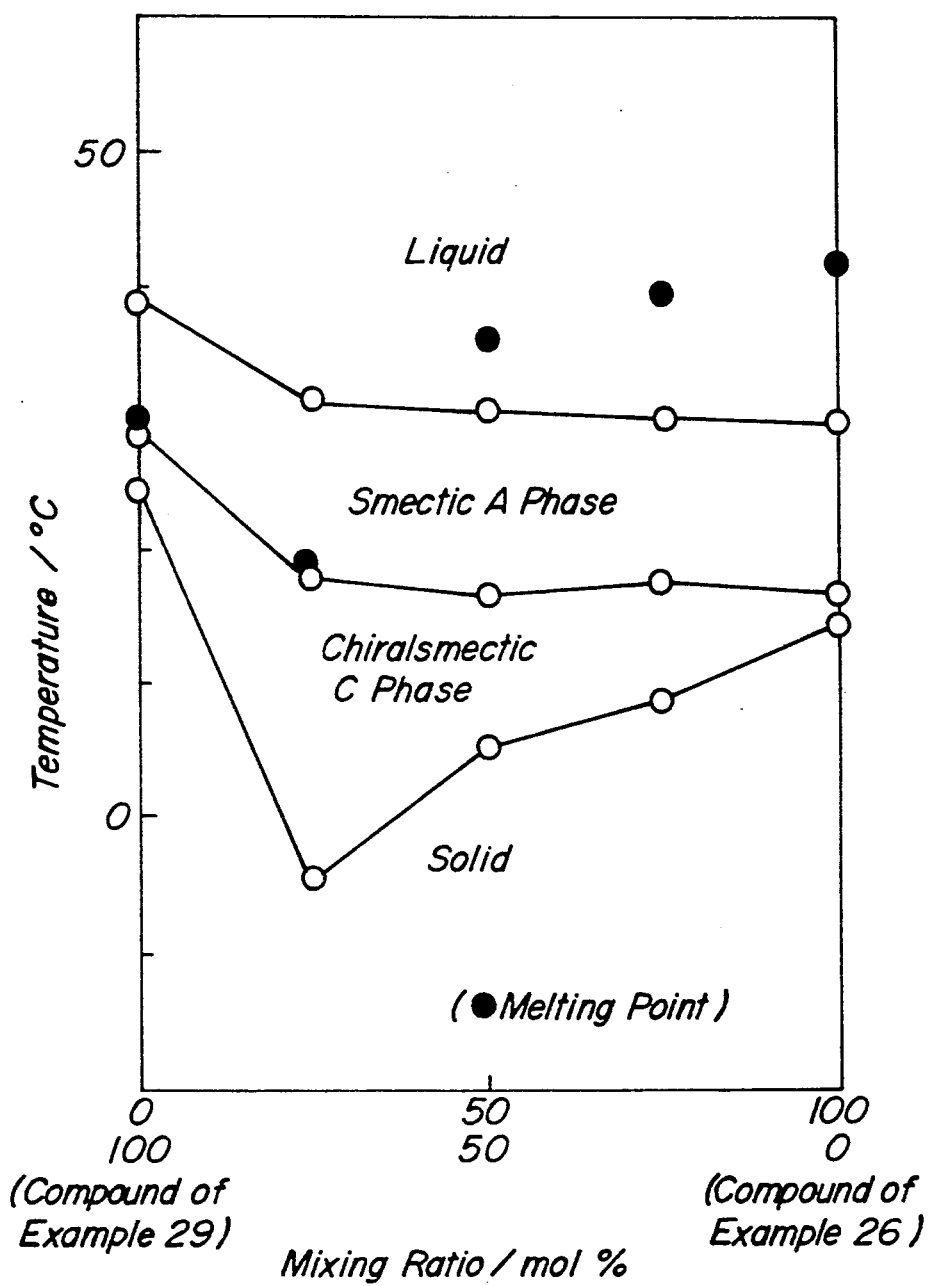
FIG_3

ALKANOYL ESTER COMPOUNDS AND THEIR INTERMEDIATES AND METHOD OF PRODUCING THE SAME

This is a continuation of application Ser. No. 07/280,721 filed as PCT JP88/00334 on Mar. 31, 1988, now abandoned.

TECHNICAL FIELD

This invention relates to novel alkanoyl ester compounds which can take a stable thermotropic liquid crystal state and can be utilized as a liquid crystal-line material useful for use in optoelectronics related elements using a liquid crystal and electrochemichromism such as display for liquid crystal television receiver, optical printer head, opto-Fourier transform element, light valve and the like, and liquid crystal compositions containing these compounds, and novel alkanoylphenyl or alkanoylbiphenyl compounds utilizable as an intermediate and a method of producing these compounds.

BACKGROUND ART

At the present liquid crystal compounds are applied to various apparatuses as a displaying material and put to practical use in watch, personal calculator, small size television receiver and the like. These apparatuses use a cell containing a liquid crystalline material composed mainly of nematic liquid crystal and adopt a display system called as TN type or STN type. In this case, the operation of the cell is based on a weak interaction ($\Delta\epsilon E^2/2$) between dielectric isotropy $\Delta\epsilon$ and electric field E, so that the cell has a drawback that the response time to the electric field is as slow as few msec. Therefore, when the cell is applied to the television receiver, an active matrix system in which many switching elements are arranged at respective pixels is generally used as the cell driving system, which becomes an obstruct for realizing a large size display screen. However, a liquid crystal cell having a high response time of p sec order and a property not changing orientation of liquid crystal molecule even in the switching-off of the electric field (memory property) is made possible by appearance of ferroelectric liquid crystals representing 4-(4-n-decyloxybenzylideneamino) cinnamic acid-2-methylbutyl ester (DOBAMBC) synthesized by R. B. Meyer et al in 1975 and a new displaying system using these liquid crystals as proposed by N. A. Clark (Applied Phys. Lett. 1980, 36, 899). When employing the displaying element with these materials, it is possible to realize a liquid crystal television receiver with a simple matrix system in which a multiplex driving mode is used without using the switching elements, which is fairly advantageous as compared with the active matrix system in view of productivity, cost, reliability, formation of large size display screen and the like.

Therefore, many ferroelectric liquid crystalline materials are synthesized and proposed up to the present. In order that these ferroelectric liquid crystalline materials are used as a displaying material, they are required to have some properties, among which a large spontaneous polarization over a wide temperature range and a chemical stability are fundamentally required. In a greater part of the early ferroelectric liquid crystals, however, the spontaneous polarization was as small as not more than 10 nC/cm², and they were chemically unstable because Schiff's base was existent in their molecules. Further, in order to provide the ferroelectric liquid crystal, it was required to introduce an optical active group, and in this case 2-octanol and 2-methyl butanol derivatives were mainly used as an asymmetric source.

Recently, there is reported the appearance of large spontaneous polarization through chemically stable ester compounds. For instance, a compound having the following formula:

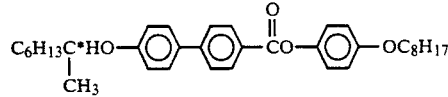

forms a liquid crystal of chiralsmectic C phase over a temperature range of 78.7°~103.3° C. and of cholesteric phase over a temperature range of 103.3°~120.8° C., and the spontaneous polarization at 83° C. of this liquid crystal is 89 nC/cm² (Japanese Patent laid open No. 61-43).

Furthermore, a compound having the following formula:

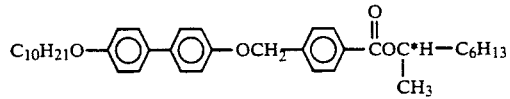

forms a liquid crystal of smectic E phase over a temperature range of 75.5°~91.5° C., of chiralsmectic H phase over a temperature range of 91.5°~107.0° C. and of chiralsmectic C phase over a temperature range of 107.0°~129.2° C., and the spontaneous polarization at 119.2° C. of this liquid crystal is 184 nC/cm² (Japanese Patent laid open No. 60-149,547).

In these compounds, the temperature range forming the chiralsmectic C phase is about 20° C. and can not be said to be sufficiently wide though the latter compound has particularly a large spontaneous polarization.

On the other hand, as to phenylpyrimidine series compounds, there is reported an example exhibiting the chiralsmectic C phase at about room temperature.

For example, a compound having the following formula:

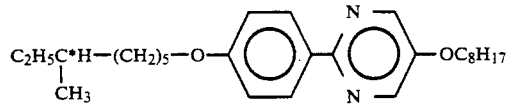

forms a liquid crystal of chiralsmectic C phase over a temperature range of 40.7°~82.8° C. and of smectic A phase over a temperature range of 82.8°~89.1° C., but it is presumed that the response time at 43° C. of this liquid crystal is as slow as 1,500 ps and the spontaneous polarization is fairly small (Japanese Patent laid open No. 61-200,973).

In addition, there is proposed a compound developing a large spontaneous polarization by using an asymmetric carbon source different from the conventional one, i.e. amino acid and having the following formula:

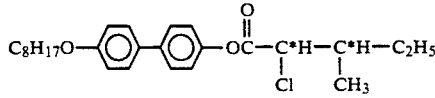

(Japanese Patent laid open No.61-165,350). This compound forms a liquid crystal of highly smectic phase over a temperature range of 33°~36° C., of chiralsmectic C phase over 36°~52° C. and of smectic A phase over 52°~66° C. and develops a large spontaneous polarization of 220 nC/cm$^2$, which is highest among ones reported up to date, at a temperature lower by 19° C. from a phase transition point to the chiralsmectic C phase on cooling. This compound exhibits the chiralsmectic C phase at about room temperature, but the temperature range can not be said to be wide. Furthermore, it is chemically unstable because carbon-chlorine bond is contained in the alkyl chain. In general, when the spontaneous polarization is about 200 nC/cm$^2$, there is frequently a case of existing highly smectic phase beneath the chiralsmectic C phase, which may have a bad influence on the production of the liquid crystal composition.

Moreover, some liquid crystal compounds having a ketone group directly bonded to benzene ring in their molecules are proposed. For instance, the following compounds are reported as a compound having a ketone group and exhibiting Sc phase (Dietrich Demus et al., "Flussige Kristalle in Tabellen I and II", Grundstoffindustrie, published on 1974 and 1984).

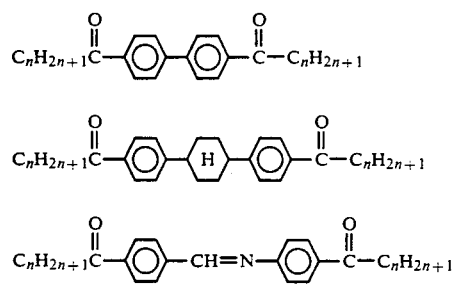

It is described that the compound of the above formula (a) shows a liquid crystal state only in the cooling when n is 9 or 10, and the compound of the formula (b) shows a liquid crystal state when n is 8, 9 or 15, and the compound of the formula (c) shows a liquid crystal state only in the cooling when n is 3~9. However, these compounds have not an asymmetric carbon and do not develop ferroelectricity. And also, there is proposed a compound having a ketone group and an asymmetric carbon in its molecule and represented by the following formula:

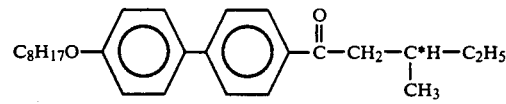

(Japanese Patent laid open No. 60-13,729).

This compound has the asymmetric carbon at its β position and exhibits a chiralsmectic C phase at 68.3° C. only in the cooling, but the value of spontaneous polarization is not known.

A compound having the following formula is also reported (Japanese Patent laid open No. 61-251,672).

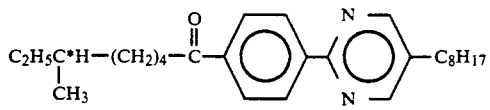

This compound forms a liquid crystal of chiralsmectic C phase over a temperature range of 67°~69° C. and of smectic A phase over 69°~79.3° C. and the response time at 61° C. of this liquid crystal is as slow as 200 μsec, from which the spontaneous polarization is presumed to be fairly small.

The above various compounds have problems that the response rate as a liquid crystal is slow because of a relatively small spontaneous polarization, the stability to light is generally lacking owing to the presence of carbon-halogen bond, the temperature range showing the ferroelectricity is narrow, highly chiralsmectic phase is existent at low temperature side of chiralsmectic C phase, and the like.

The inventors have made various studies in order to solve these problems and found that compounds having an asymmetric carbon in u position and a ketone group directly bonded to benzene ring in molecule are surprisingly stable to light or the like, enantiotropic and wide in the temperature range showing a liquid crystal state, and particularly forms a ferroelectric liquid crystal having a large spontaneous polarization and a fast response rate when the alkyl group is an optical active group, and that a compound showing no highly chiralsmectic phase at low temperature side of chiralsmectic C phase or directly transiting from chiralsmectic C phase to crystal is existent among these compounds.

The invention is based on the above knowledges and is to provide novel alkanoyl ester compounds, a liquid crystal composition containing this compound, intermediates for these compounds and a method of producing the same.

DISCLOSURE OF INVENTION

The invention provides a novel alkanoyl ester compound represented by the following general formula (I):

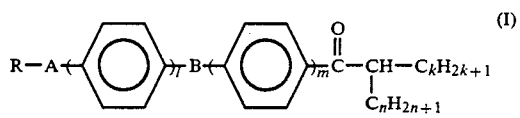

(wherein A is —, —O—,

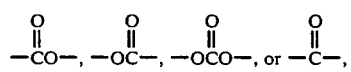

B is

e and m are 1 or 2 provided that both are not simultaneously 2, k and n are an integer of 1 or more, respectively, provided that k>n, and R is an alkyl group), a liquid crystal composition containing this compound, a novel alkanoylphenyl compound represented by the following general formula (II):

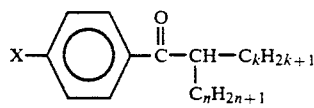

(II)

(wherein X is HO—, HOOC— or HOCH$_2$—, and k and n are an integer of 1 or more, respectively, provided that k>n) or a novel alkanoylbiphenyl compound represented by the following general formula (III):

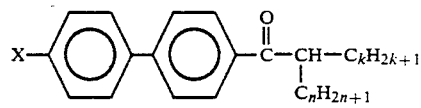

(III)

(wherein X is HO—, HOOC— or HOCH$_2$—, and k and n are an integer of 1 or more, respectively, provided that k>n) as an intermediate for the production of the above compound, and a method of producing the same.

The alkyl group shown by R in the above formula (I) is preferable to have a carbon number of 1~18 from a viewpoint of actual production factors such as easy availability of starting materials and the like. Further, it is preferable from the same reason that k is 2~16 and n is 1~4.

Moreover, when carbon bonding $C_kH_{2k+1}$ and $C_nH_{2n+1}$ in the above formula is an asymmetric carbon and an optical activity is introduced into the compound taking this carbon as an asymmetric center, the resulting liquid crystal exhibits a chiralsmectic C phase and is preferable as a ferroelectric liquid crystal having a very large spontaneous polarization and a fast response rate.

Examples of the novel alkanoylphenyl compound represented by the above general formula (II) and novel alkanoylbiphenyl compound represented by the above general formula (III) capable of forming a synthetic intermediate of the above formula (I), and their physical and chemical properties and a production method thereof will be described.

At first, there are exemplified alkanoylphenyl compounds when X of the formula (II) is HO—.

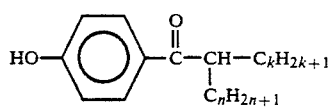

(II-A)

(+)-4-(2-methylbutanoyl) phenol

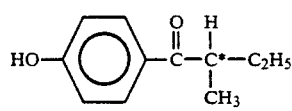

1 $^1$H-NMR(in CDCl$_3$, TMS standard, ppm): 8.2~7.9(broad, 1H), 8.0(ABq, 2H), 7.0(ABq, 2H), 3.4(m, 1H), 1.9(m, 1H), 1.4(m, 1H), 1.2(d, 3H), 0.9(t, 3H)
2 IR(cm$^{-1}$): 3250, 1650, 1580
3 Mass: 174(M+)
4 $[\alpha]^{25}$D: +38.6°

(+)-4-(2-methyloctanoyl) phenol

1 $^1$H-NMR(in CDCl$_3$, TMS standard, ppm): 8.2~7.9(broad, 1H), 8.0(ABq, 2H), 7.0(ABq, 2H), 3.4(m, 1H), 1.9~1.2(m, 17H), 0.9(t, 3H)
2 IR(KBr cm$^{-1}$): 3250, 1650, 1580
3 Mass: 262(M+)
4 $[\alpha]^{25}$D: +22.7°

(+)-4-(2-methyldecanoyl) phenol

1 $^1$H-NMR(in CDCl$_3$, TMS standard, ppm): 8.2~7.9(broad, 1H), 8.0(ABq, 2H), 7.0(ABq, 2H), 3.4(m, 1H), 1.9~1.2(m, 17H), 0.9(t, 3H)
2 IR(KBr cm$^{-1}$): 3250, 1650, 1580
3 Mass: 262(M+)
4 $[\alpha]^{25}$D: +18.6°

(+)-4-(2-methylheptanoyl) phenol

1 $^1$H-NMR(in CDCl$_3$, TMS standard, ppm): 8.2~7.9(broad, 1H), 8.0(ABq, 2H), 7.0(ABq, 2H), 3.4(m, 1H), 1.9~1.2(m, 11H), 0.9(t, 3H)
2 IR(KBr cm$^{-1}$): 3250, 1650, 1580
3 $[\alpha]^{25}$D: +26.9°

(+)-4-(2-methylnonanoyl) phenol

1 $^1$H-NMR(in CDCl$_3$, TMS standard, ppm): 8.2~7.9(broad, 1H), 8.0(ABq, 2H), 7.0(ABq, 2H), 3.4(m, 1H), 1.9~1.2(m, 15H), 0.9(t, 3H)
2 IR(KBr cm$^{-1}$): 3250, 1650, 1580
3 $[\alpha]^{25}$D: +19.1°

(+)-4-(2-ethyloctanoyl) phenol

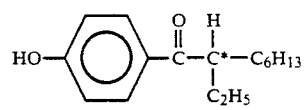

1 $^1$H-NMR(in CDCl$_3$, TMS standard, ppm): 7.9(ABq, 2H), 7.8(s, 1H), 7.0(ABq, d), 3.4(m, 1H), 1.8(m, 2H), 1.5(m, 2H), 1.2(ds, 8H), 0.9(t, 6H)
2 IR(neat, cm$^{-1}$): 3250, 2920, 1640, 1580
2 Mass: 248(M+)
4 $[\alpha]^{25}$D(in 10 wt% CHCl$_3$): +0.55°

(+)-4-(2-propyldecanoyl) phenol

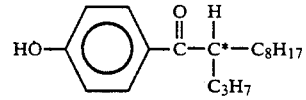

1 $^1$H-NMR(in CDCl$_3$, TMS standard, ppm): 8.0(s, 1H), 7.9(ABq, 2H), 6.9(ABq, 2H), 1.2(bs, 18H), 0.9(t, 9H)
2 IR(neat, cm$^{-1}$): 3250, 2970, 1640, 1580
3 Mass: 290(M+)
4 $[\alpha]^{25}$D(in 27. wt% CHCl$_3$): +2.6°

The compounds of the above formula (II-A) can easily be obtained by reacting an acid halide made from 2-alkyl-1-alkanol as a starting material with phenol.

The starting material of 2-alkyl-1-alkanol can easily be produced from 1,2-epoxyalkane. That is, 1,2-epoxyalkane is first converted into 2-alkyl-1-alkanol by ring opening reaction with trialkylaluminum. This is carried out by dropwise adding 1,2-epoxyalkane to a solution of trialkylaluminum in an organic solvent such as hexane, decane, tetradecane, cyclohexane or the like within a temperature range of −80° C.~150° C., provided that the temperature range is up to reflux temperature in case of low boiling organic solvent, with stirring, reacting them for 1~120 hours, and pouring the resulting reaction solution after the completion of the reaction into a diluted hydrochloric acid to conduct hydrolysis. In this reaction, it is favorable that the trialkylaluminum is used in an amount of 0.5 3 mol, preferably 1~2 mol per 1 mol of 1,2-epoxyalkane. The product of 2-alkyl-1-alkanol can be isolated and purified by the well-known means such as extraction, phase separation, distillation, column chromatography and so on.

According to the invention, when it is intended to synthesize a ferroelectric liquid crystal compound having a large spontaneous polarization and a fast response rate if optical activity is given to an asymmetric carbon to $-C_kH_{2k+1}$ and $-C_nH_{2n+1}$ of the compound Of the above formula (II), 2-alkyl-1-alkanol used as the starting material according to the invention is preferable to have an optical purity of at least 60%ee.

In order to obtain such an optically active 2-alkyl-1-alkanol, it is enough to use 1,2-epoxyalkane having an optical activity. The 1,2-epoxyalkane having an optical activity can be obtained by reacting a microorganism belonging to Nocardia and having an epoxy formability on a culture containing α-olefin under aerobic conditions (Japanese Patent Application Publication No. 56-40). The feature that 1,2-epoxyalkane obtained by the method of utilizing such a microorganism has an optical activity has been confirmed later, but it can be produced very simply from α-olefin and cheaply, so that it is particularly advantageous.

In the synthesis of compounds of the above formula (II-A), 2-alkyl-1-alkanol is first oxidized with an oxidizing agent. The oxidizing agent is selected from substances permitting oxidation without racemization in the synthesis of optically active compounds, among which potassium permanganate is most convenient and preferable. The oxidation reaction using the potassium permanganate is favorable to be carried out in the presence of an acid, in which sulfuric acid is used as an acid. In this reaction, 2-alkyl-1-alkanol is added to an aqueous solution of 10~50% sulfuric acid, to which potassium permanganate is slowly added in a molar amount of 1~3 times to alcohol while maintaining temperature at 20°~30° C. to conduct the reaction. When the thus obtained reaction mixture is added to an aqueous solution of sodium bisulfite, unreacted potassium permanganate and manganese dioxide are dissolved into water, so that the reaction product can be extracted with an organic solvent such as ether or the like. After the repetition of such an extraction, 2-alkylalkanoic acid can be isolated and purified by the well-known means such as distillation, column chromatography or the like.

The thus obtained 2-alkylalkanoic acid is converted into an acid halide by reacting with an inorganic halide such as thionyl chloride, phosphorus pentachloride, phosphorus trichloride, phosphoryl chloride or the like. This reaction is preferable to be performed by holding the inorganic halide at a temperature of 20°~60° C., adding dropwise the 2-alkylalkanoic acid with stirring and reacting them at a temperature of 50°~90° C. for 1~3 hours.

When the thus obtained acid halide is reacted with phenol in the presence of a catalyst such as anhydrous aluminum chloride, boron trifluoride or the like, esterification is first caused and then rearrangement reaction is caused, whereby a so called phenolacylated 4-(2-alkylalkanoyl) phenol is produced without racemization in case that it has an optical activity.

This acylation operation is carried out by dissolving the above phenol in an organic solvent such as methylene chloride or the like, holding it at a temperature of −20°~−10° C., adding dropwise the above acid halide with stirring and reacting them at a temperature of −10°~10° C. for 1~3 hours, whereby phenyl-2-methyl alkanoic acid ester can be obtained. This ester compound is reacted in the presence of a catalyst such as anhydrous aluminum chloride or the like at a temperature of 10°~40° C. for 2~10 hours, whereby acylated 4-(2-alkylalkanoyl)phenol can be obtained.

As the synthesis of other 4-(2 alkylalkanoyl) phenols, an acid halide is first reacted with anisole in the presence of a catalyst such as anhydrous aluminum chloride, boron trifluoride or the like to produce a compound acylated at a para position. This compound is subjected to an isolation operation such as column chromatography or the like to obtain 4-(2-alkylalkanoyl) anisole without racemization in case that it has an optical activity.

This acylation operation is carried out by dissolving acid chloride and anhydrous aluminum halide in an organic solvent such as methylene chloride or the like, adding dropwise it to a mixture of anisole dissolved in an organic solvent such as methylene chloride or the like with holding at a temperature of −10° C.~10° C. and then reacting them for 1~10 hours. Further, the thus obtained 4-(2-alkylalkanoyl) anisole is dissolved in an organic solvent such as toluene or the like, added with anhydrous aluminum halide, and then reacted at room temperature for 1~10 hours and further at 40° C. for 1~5 hours, whereby 4-(2-alkylalkanoyl) phenol can be obtained without racemization in case of optical activity.

Alkanoylphenyl compounds when X in the above formula (II) is HOCH$_2$— are exemplified below.

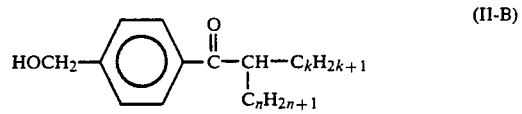

(II-B)

(+)-4-(2-methyloctanoyl) benzyl alcohol

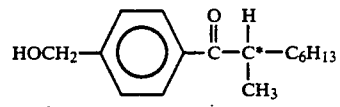

1 $^1$H-NMR (in CDCl$_3$, TMS standard, ppm): 7.92(d, 2H), 7.40(d,2H), 4.68(s, 2H), 3.43(m, 1H), 2.0~1.1(m, 10H), 1.15(d, 3H), 0.85(t, 3H)

2 IR(cm$^{-1}$): 3400, 2910, 2840, 1675, 1605, 1461, 1375, 1225

3 [α]$^{25}$D (4.0 wt%, in CHCl$_3$): +17.5°

The compound of the above type is obtained by reacting commercially available 4-halobenzyl alcohol with an alkylvinyl ether to form 4-halobenzyl (1-alkoxy) ethylether, coupling it with 2-alkylalkanoic acid halide through Grignard reaction and then removing a protective group under acidic condition even in case of a compound having an optical activity.

Alkanoylphenyl compounds when X of the above formula (II) is HOOC— are exemplified below.

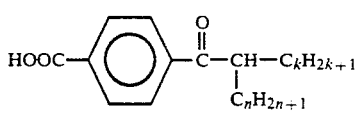
(II-C)

(+)-4-(2-methyloctanoyl) benzoic acid

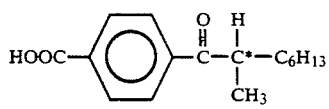

1  $^1$H-NMR (in CDCl$_3$, TMS standard, ppm): 10.50(broad S, 1H), 8.18(ABq, 2H), 7.96(ABq, 2H), 3.41(m, 1H), 1.8~1.1(m, 10H), 1.13(d, 3H), 0.82(t, 3H)
2  IR(cm$^{-1}$): 3300~2600, 2910, 2840, 1705, 1680, 1425, 1285, 1225, 715
3  $[\alpha]^{25}$D (3.5 wt%, in CHCl$_3$): +7.9°

The compound of the above type is obtained by oxidizing 4-(2-alkylalkanoyl) benzyl alcohol with potassium permanganate or the like without racemization even in case of a compound having an optical activity. Alkanoyl biphenyl compounds as another intermediate in the compound of the above formula (I) when X of the above formula (III) is HO— are exemplified below.

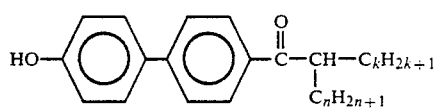
(III-A)

(+)-4-hydroxy-4'-(2-methylbutanoyl) biphenyl

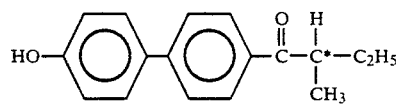

1  $^1$H-NMR (in CDCl$_3$, TMS standard, ppm): 8.05(d, 2H), 7.65(d, 2H), 7.06(d, 2H), 3.50(m, 1H), 2.10~1.40(m, 2H), 1.22(d, 3H), 0.96(t, 3H)
2  IR(KBr, cm$^{-1}$): 3300, 2930, 2910, 1650, 1590
3  Mass 254(M+)
4  $[\alpha]^{25}$D (12.8 wt%, in CHCl$_3$): +19.0°

(+)-4-hydroxy-4'-(2-methyloctanoyl) biphenyl

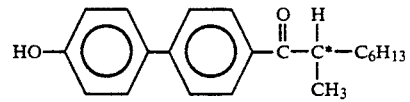

1  $^1$H-NMR (in CDCl$_3$, TMS standard, ppm): 7.98(d, 2H), 7.60(d, 2H), 7.50(d, 2H), 6.92(d, 2H), 6.00(br, 1H), 3.84(m, 1H), 2.00~1.15(m, 10H), 1.22(d, 3H), 1.0~0.75(m, 6H)
2  IR(neat, cm$^{-1}$): 3300, 2900, 2850, 1650, 1585
3  Mass: 310(M+)
4  $[\alpha]^{25}$D (4.8 wt%, in CHCl$_3$): +2.6°

In case of the above type compounds, 2-alkyl alkanoic acid is esterified by condensation with hydroxy biphenyl. This esterification easily proceeds at a temperature of 60°~120° C. in the presence of a mineral acid catalyst. In this case, it is favorable to conduct the reaction in the presence of an organic solvent such as benzene, toluene, xylene or the like under the reflux of the solvent. As the mineral acid catalyst, use may be made of hydrochloric acid, sulfuric acid, thionyl chloride, boron fluoride and the like.

Then, the biphenyl ester of 2-alkyl alkanoic acid is reacted with a halide of 2-alkyl alkanoic acid. That is, when the biphenyl ester of 2-alkyl alkanoic acid and the halide thereof are reacted in the presence of a catalyst such as anhydrous aluminum chloride, boron trifluoride or the like, it is added as 2-alkyl alkanoyl to 4'-position of biphenyl in the biphenyl ester, whereby 2-alkyl alkanoic acid-4'-(2-alkylalkanoyl) biphenyl is produced or the like without racemization even in case of 2-alkyl alkanoic acid halide having an optical activity. In this case, it is a matter of course that 2-alkyl alkanoic acid is the same as used in the above acid halogenation or is a compound having a different chain length.

This reaction operation is enough to be carried out by dissolving the biphenyl ester of 2-alkyl alkanoic acid and 2-alkyl alkanoic acid halide in an organic solvent such as nitrobenzene, methylene chloride or the like and holding at a temperature of −20°~50° C. for 1~100 hours with stirring.

The 2-alkyl alkanoic acid-4'-(2-alkylalkanoyl) biphenyl is hydrolyzed with an alkali such as sodium hydrogen carbonate, potassium hydrogen carbonate or the like in the presence of a solvent such as alcohol/water or the like at a temperature of −20°~50° C. and then neutralized with an inorganic acid such as hydrochloric acid, sulfuric acid or the like, whereby the compound of the above type can be obtained.

Alkanoyl biphenyl compounds when X of the above formula (III) is HOCH$_2$—are exemplified below.

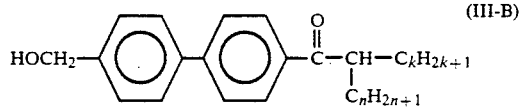
(III-B)

(+)-4 -(2-methyloctanoyl)-4-hydroxydimethyl biphenyl

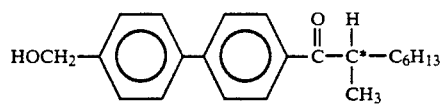

1  $^1$H-NMR (in CDCl$_3$, TMS standard, ppm): 8.02(d, 2H), 7.65(d, 2H), 7.45(d, 2H), 4.71(s, 2H), 3.45(m, 1H), 2.75(broad s, 1H), 1.7~1.2(m, 10H), 1.18(d, 3H), 0.85(t, 3H)
2  IR(KBr, cm$^{-1}$): 3400, 2910, 2840, 1675, 1600, 1480, 1212, 810
4  $[\alpha]^{25}$D (6.1 wt%, in CHCl$_3$): +3.9°

In the above type compound, a commercially available 4-halo biphenyl is first reacted with acetyl chloride to form 4-acetyl-4'-halo biphenyl, which is converted into 4'-halo biphenyl-4-carboxylic acid through haloform reaction and reduced with lithium aluminum hydride to form 4'-halo 4-hydroxymethyl biphenyl. This compound is reacted with an alkylvinyl ether to form 4-(4-halophenyl) benzyl-(1-alkoxy) ethyl ether, which is coupled with 2-alkyl alkanoic acid chloride through Grignard reaction and a protective group is removed therefrom under an acidic condition, whereby the above type compound can be obtained without racemization even in case of a compound having an optical activity.

Alkanoyl biphenyl compounds when X of the above formula (III) is HOOC— are exemplified below.

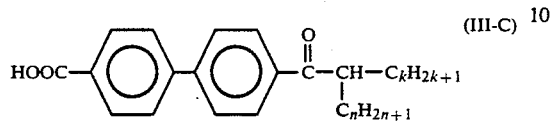

(−)-4'-(2-methyloctanoyl) biphenyl-4-carboxylic acid

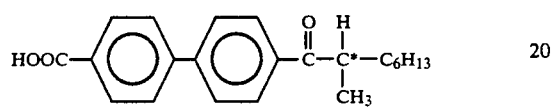

1  $^1$H-MMR (in CDCl$_3$, TMS standard, ppm): 10.55(broad s, 1H), 8.23(d, 2H), 8.07(d, 2H), 7.73(d, 2H), 7.65(d, 2H), ( 3 45(m, 1H), 1.80∼1.20(m, 10H), 1.20(d, 3H), 0.85(t, 3H)
2  IR(KBr, cm$^{31}$ $^1$): 3200 2500, 2910, 2840, 1685, 1675, 1600, 1425, 1300
3  $[\alpha]^{25}$D (1.1 wt%, in CHCl$_3$): −19.90°

The compound of the above type can be obtained by oxidizing 4'-(2-alkylalkanoyl)-4-hydroxymethyl biphenyl with an oxidizing agent such as potassium permanganate or the like without racemization even in case of a compound having an optical activity.

Then, typical examples of the compound of the above formula (I) and their physical and chemical properties and method of producing the same will be described below.

At first, compounds of the following type in the above formula (I) will be described below.

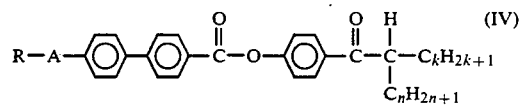

(A is anyone of —, —O—,

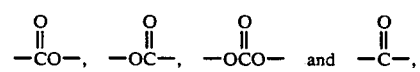

and R is an alkyl group, and each of k and n is an integer of 1 or more provided that k>n).

In general, this compound can be produced by oxidizing 2-alkyl-1-alkanol to form 2-alkyl-1-alkanoic acid, converting it into an acid halide, reacting with phenol to form 4-alkanoyl phenol and then esterifying this 4-alkanoyl phenol with 4'-alkoxybiphenyl-4-carboxylic acid, 4'-alkylbiphenyl-4-carboxylic acid, 4'-alkanoyloxybiphenyl-4-carboxylic acid, 4'-alkyloxycarbonyloxybiphenyl-4-carboxylic acid, 4'-alkyloxycarbonylbiphenyl-4-carboxylic acid or 4'-alkanoylbiphenyl-4-carboxylic acid.

In the above formula (IV), compounds of a type having the following formula are first exemplified concretely.

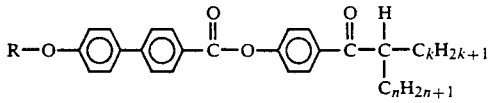

4-(2-methylbutanoyl) phenyl, 4'-octyloxybiphenyl-4-carboxylic acid ester

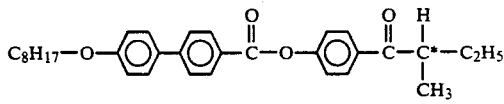

1  $^1$H-NMR (in CDCl$_3$, TMS standard, ppm): 8.3∼7.0(12H), 4.0(t, 2H), 3.4(m, 1H), 1.9 0.9(m, 23H)
2  IR(KBr, cm$^{-1}$): 2950 2850, 1735, 1680, 1600
3  Mass: 486(M+)

4-(2-methyldecanoyl) phenyl, 4'-octyloxybiphenyl-4-carboxylic acid ester

1  $^1$H-NMR (in CDCl$_3$, TMS standard, ppm): 8.3∼7.0(12H), 4.0(t, 2H), 3.4(m, 1H), 1.9 0.9(m, 35H)
2  IR(KBr, cm$^{-1}$ $^1$): 2950 2850, 1735, 1680, 1600
3  Mass: 570(M+)

4-(2-methylbutanoyl) phenyl, 4'-dodecyloxybiphenyl-4-carboxylic acid ester

1  $^1$H-NMR (in CDCl$_3$, TMS standard, ppm): 8.3∼7.0(12H), 4.0(t, 2H), 3.4(m, 1H), 1.9∼0.9(m, 31H)
2  IR(KBr, cm$^{-1}$): 2950 2850, 1735, 1680, 1600
3  Mass: 542(M+)

4-(2-methyloctanoyl) phenyl, 4'-octyloxybiphenyl-4-carboxylic acid ester

1  $^1$H-NMR (in CDCl$_3$,TMS standard, ppm): 8.3∼7.0(12H), 4.0(t, 2H), 3.4(m, 1H), 1.9∼0.9(m, 31H)
2  IR(KBr, cm$^{-1}$): 2950 2850, 1735, 1680, 1600
3  Mass: 542(M+)

4-(2-methylheptanoyl) phenyl, 4'-octyloxybiphenyl-4-carboxylic acid ester

1  $^1$H-NMR (in CDCl$_3$, TMS standard, ppm): 8.3∼7.0(12H), 4.0(t, 2H), 3.4(m, 1H), 1.9∼0.9(m, 29H)
2  IR(KBr, cm$^{-1}$): 2950 2850, 1735, 1680, 1600
3  Mass: 528(M+)

4-(2-methylnonanoyl)phenyl, 4'-hexyloxybiphenyl-4-carboxylic acid ester

1  $^1$H-NMR (in CDCl$_3$, TMS standard, ppm): 8.3∼7.0(12H), 4.0(t, 2H), 3.4(m, 1H), 1.9∼0.9(m, 29H)
3  IR(KBr, cm$^{-1}$): 2950 2850, 1735, 1680, 1600
3  Mass: 528(M+)

4-2-methylnonanoyl) phenyl, 440 -octyloxybiphenyl-4-carboxylic acid ester

1  $^1$H-NMR (in CDCl$_3$, TMS standard, ppm): 8.3∼7.0(12H), 4.0(t, 2H), 3.4(m, 1H), 1.9∼0.9(m, 33H)
2  IR(KBr, cm$^{-1}$): 2950 2850, 1735, 1680, 1600
3  Mass: 556(M+)

4-(2-methylnonanoyl) phenyl, 4'-nonyloxybiphenyl-4-carboxylic acid ester

1  $^1$H-NMR (in CDCl$_3$, TMS standard, ppm): 8.3∼7.0(12H), 4.0(t, 2H), 3.4(m, 1H), 1.9∼0.9(m, 35H)
2  IR(KBr, cm$^{-1}$): 2950 2850, 1735, 1680, 1600
3  Mass: 570(M+)

4-(2-methylnonanoyl) phenyl,
4'-dodecyloxybiphenyl-4-carboxylic acid ester

1 ¹H-NMR (in CDCl₃, TMS standard, ppm):
8.3~7.0(12H), 4.0(t, 2H), 3.4(m, 1H), 1.9~0.9(m, 41H)
2 IR(KBr, cm⁻¹): 2950.2850, 1735, 1680, 1600
3 Mass: 612(M+)

4-(2-ethyloctanoyl) phenyl,
4'-octyloxybiphenyl-4-carboxylic acid ester

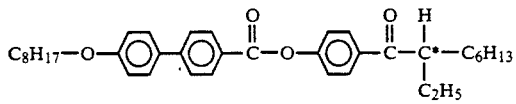

1 ¹H-NMR (in CDCl₃, TMS standard, ppm):
8.3(ABq, 2H), 8.1(ABq, 2H), 7.7(ABq, 2H), 7.6(ABq, 2H), 7.3(ABq, 2H), 7.0(ABq, 2H), 4.0(t, 2H), 3.4(m, 1H), 1.9~1.4(m, 41H), 1.4~1.2(m, 20H), 0.9(t, 9H)
2 IR(KBr, cm⁻¹): 2950 2850, 1735, 1680, 1600
3 Mass: 556(M+)

4-(2-propyldecanoyl) phenyl,
4-'-octyloxybiphenyl-4-carboxylic acid ester

1 ¹H-NMR (in CDCl₃, TMS standard, ppm):
8.3(ABq, 2H), 8.1(ABq, 2H), 7.7(ABq, 2H), 7.6(ABq, 2H), 7.3(ABq, 2H), 7.0(ABq, 2H), 4.0(t, 2H), 3.4(m, 1H), 1.9~1.4(m, 4H), 1.4~1.2(m, 20H), 0.9(t, 9H)
2 IR(KBr,cm⁻¹): 2900, 2850, 1735, 1680, 1500
3 Mass: 598(M+)

These compounds of the above type can easily be obtained by esterifying 4-alkanoyl phenol with 4'-alkyloxybiphenyl-4-carboxylic acid.

Moreover, 4'-alkyloxybiphenyl-4-carboxylic acid can easily be obtained by hydrolyzing a commercially available 4'-alkyloxy-4-cyano biphenyl under alkali condition or by reacting 4-hydroxybiphenyl-4'-carboxylic acid obtained by hydrolysis of commercially available 4-hydroxy-4'-cyano biphenyl with 1-bromoalkane or the like.

In the above formula (IV), compounds of a type having the following formula will be concretely exemplified below.

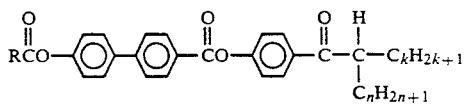

4-(2-methyloctanoyl) phenyl,
4'-decanoyloxybiphenyl-4-carboxylic acid ester

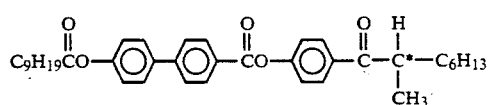

1 ¹H-NMR (in CDCl₃, TMS standard, ppm):
8.30~8.00(ABq, 4H), 7.80~7.61(ABq, 4H), 7.40~7.19(ABq, 4H), 3.4(m, 1H), 2.60(t, 2H), 1.90~1.18(m, 27H), 0.88(t, 6H)
2 IR(KBr, cm⁻¹): 2900, 2850, 1745, 1730, 1676, 1600
3 Mass: 554(M+)

The compound of the above type can be obtained by reacting alkanoyl phenol with 4-alkanoyloxybiphenyl-4'-carboxylic acid without racemization even in case of a compound having an optical activity. Moreover, the 4-alkanoyloxybiphenyl-4'-carboxylic acid can easily be obtained by reacting 4-hydroxybiphenyl-4'-carboxylic acid obtained through hydrolysis of a commercially available 4-hydroxy-4'-cyano biphenyl with a commercially available alkanoic acid chloride.

In the above formula (IV), compounds of a type having the following formula will be concretely exemplified below.

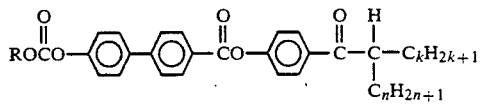

4-(2-methyloctanoyl) phenyl,
4'-octyloxycarbonyloxy-biphenyl-4-carboxylic acid ester

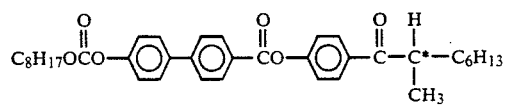

1 ¹H-NMR (in CDCl₃, TMS standard, ppm):
8.45~8.12(ABq, 4H), 7.85~7.73(ABq, 4H), 7.52~7.37(ABq, 4H), 4.28(t, 2H), 3.43(m, 1H), 1.90~1.19(m, 25H), 0.92(t, 3H), 0.89(t, 3H)
211 IR(KBr, cm⁻¹): 2900, 2850, 1755, 1735, 1675, 1595
3 Mass: 586(M+)

This type of the compound can be obtained by reacting alkanoyl phenol with 4-alkyloxycarbonyloxy-biphenyl-4'-carboxylic acid without racemization even in case of a compound having an optical activity. Moreover, the 4-alkyloxycarbonyloxybiphenyl-4'-carboxylic acid can easily be obtained by reacting 4-hydroxybiphenyl-4'-carboxylic acid obtained through hydrolysis of a commercially available 4- hydroxy-4'-cyano biphenyl with a commercially available alkylformic acid chloride.

In the formula (IV), compounds of a type having the following formula will be concretely exemplified below.

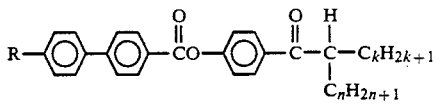

4-(2-methyloctanoyl) phenyl,
4-'-nonylbiphenyl-4-carboxylic acid ester

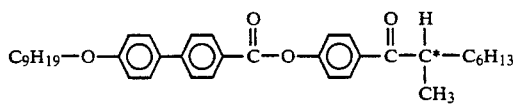

1 ¹H-NMR (in CDCl₃, TMS standard, ppm):
8.3~7.2(4H), 3.45(m, 1H), 2.65(t, 2H), 1.9~1.2(m, 27H), 0.9(m, 6H)
2' IR(KBr, cm⁻¹): 2950 2850, 1735, 1675, 1600

The above type compound can be obtained by hydrolyzing a commercially available 4'-alkyl-4-cyanobiphenyl compound to form 4'-alkylbiphenyl-4-carboxylic acid and then esterifying with 4-(2-alkylalkanoyl) phenol without racemization even in case of a compound having an optical activity.

Secondly, compounds of the following type in the above formula (I) will be described below.

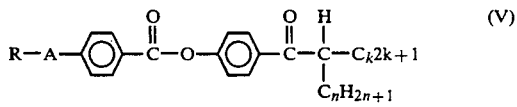

(A is any one of —, —O—,

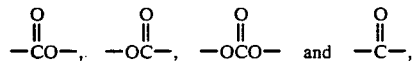

and R is an alkyl group, and each of k and n is an integer of 1 or more provided that k>n).

In general, this compound can be produced by oxidizing 2-alkyl-1-alkanol to form 2-alkyl-1-alkanoic acid, converting it into an acid halide, reacting the acid halide with phenol to obtain 4-alkanoyl phenol and then esterifying the 4-alkanoyl phenol with 4-alkoxy benzoic acid, 4-alkyl benzoic acid, 4-alkanoyloxy benzoic acid, 4-alkyloxycarbonyloxy benzoic acid, 4-alkyloxycarbonyl benzoic acid or 4-alkanoyl benzoic acid.

In the above formula (V), compounds of a type having the following formula are concretely exemplified below.

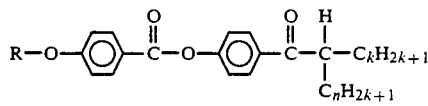

4-(2-methyloctanoyl) phenyl-4-octyloxy benzoic acid

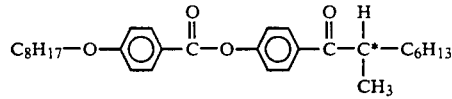

1 $^1$H-NMR (in CDCl$_3$, TMS standard, ppm): 8.2(ABq, 2H), 8.0(ABq, 2H), 7.3(ABq, 2H), 4.1(t, 2H), 3.5(m, 1H), 1.9~0.9(m, 31H)
2 IR(KBr, cm$^{-1}$): 2950, 2850, 1720, 1680, 1610
3 Mass: 466(M+)

4-2-methyloctanoyl) phenyl-4-tetradecyloxy benzoic acid ester

1 $^1$H-NMR (in CDCl$_3$, TMS standard, ppm): 8.2(ABq, 2H), 8.0(ABq, 2H), 7.3(ABq, 2H), 7.0(ABq, 2H), 4.1(t, 2H), 3.5(m, 1H), 1.9~0.9(m, 43H)
2 IR(KBr, cm$^{-1}$): 2950, 2850, 1720, 1680, 1610
3 Mass: 550(M+)

4-(2-methyloctanoyl) phenyl-4-hexyloxy benzoic acid ester

1 $^1$H-NMR (in CDCl$_3$, TMS standard, ppm): 8.2(ABq, 2H), 8.0(ABq, 2H), 7.3(ABq, 2H), 7.0(ABq, 2H), 4.1(t, 2H), 3.5(m, 1H), 1.9~0.9(m, 27H)
3 IR(KBr, cm$^{-1}$): 2950, 2850, 1720, 1680, 1610
3 Mass 438(M+)

These compounds of the above type can be obtained by reacting 4-alkanoyl phenol with 4-alkoxy benzoic acid under usual esterification conditions without racemization even in case of a compound having an optical activity.

Moreover, the 4-alkoxy benzoic acid is commercially available, but can be cheaply obtained by reacting a commercially available 4-hydroxy benzoic acid with an alkyl halide under an alkali condition.

In the formula (v), compounds of a type having the following formula are concretely exemplified below.

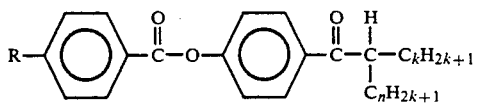

4-(2-methyloctanoyl) phenyl, 4-octyl benzoic acid ester

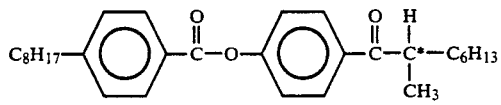

1 $^1$H-NMR (in CDCl$_3$, TMS standard, ppm): 8.3~8.0(m, 4H), 7.4~7.2(m, 4H), 3.2(m, 1H), 2.8(t, 2H), 1.9~0.9(m, 31H)
2 IR(KBr, cm$^{-1}$): 2940, 1740, 1680, 1600
3 Mass: 466(M+)

The above type compound can be obtained by esterifying commercially available 4-alkyl benzoic acid with 4-(2-alkylalkanoyl) phenol without racemization even in case of a compound having an optical activity.

In the formula (V), compounds of a type having the following formula are concretely exemplified below.

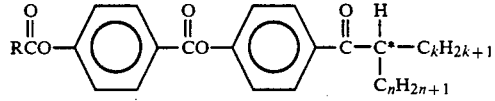

4-decanoyloxy benzoic acid-4-(2-methyloctanoyl) phenyl

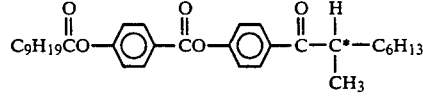

1 $^1$H-NMR (in CDCl$_3$, TMS standard, ppm): 8.3~8.0(m, 4H), 7.4~7.2(m, 4H), 3.5(m, 1H), 2.6(t, 2H), 1.9~0.8(m, 33H)
2 IR(KBr, cm$^{-1}$): 2950, 2850, 1760, 1740, 1680, 1610
3 Mass 508(M+)

4-nonanoyloxy benzoic acid-4-(2-methyloctanoyl) phenyl

1 $^1$H-NMR (in CDCl$_3$, TMS Standard, ppm): 8.3~8.0(m, 4H), 7.4~7.2(m, 4H), 3.5(m, 1H), 2.6(t, 2H), 1.9~0.8(m, 31H)
2 IR(KBr, cm$^{-1}$): 2940, 1740, 1680, 1600

The compounds of the above type can be synthesized by reacting alkanoyl phenol with 4-alkanoyloxy benzoic acid. Moreover, the 4 alkanoyloxy benzoic acid can easily be obtained by reacting a commercially available 4-hydroxy benzoic acid with a commercially available alkanoic acid chloride.

In the formula (V), compounds of a type having the following formula are concretely exemplified below.

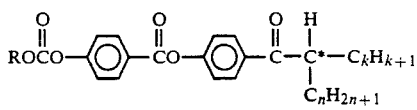

4-dodecyloxycarbonyl benzoic acid-4-(2-methyloctanoyl) phenyl

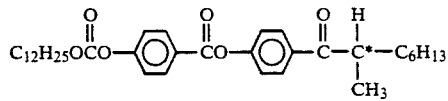

1 $^1$H-NMR (in CDCl$_3$, TMS standard, ppm): 8.2(ABq, 2H), 8.1(ABq, 2H), 7.4(ABq, 2H), 7.2(ABq, 2H), 4.3(t, 2H), 3.5(m, 1H), 1.9~0.9(m, 39H)

2 IR(KBr, cm$^{-1}$): 2920, 2850, 1760, 1740, 1680, 1600

3 Mass: 566(M+)

The compounds of the above type can be synthesized by reacting alkanoyl phenol with alkyloxycarbonyloxy benzoic acid. Moreover, the 4-alkyloxycarbonyloxy benzoic acid can easily be obtained by reacting a commercially available 4-hydroxy benzoic acid with a commercially available alkyl formic acid chloride.

In the formula (V), compounds of a type having the following formula are concretely exemplified below.

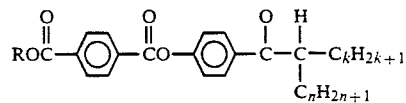

4-(2-methyloctanoyl) phenyl-4-octyloxycarbonyl benzoic acid ester

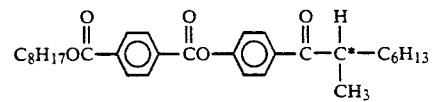

1 $^1$H-NMR (in CDCl$_3$, TMS standard, δ ppm): 8.34~7.26(8H), 4.37(t, 2H), 3.47(m, 1H), 1.90~0.89(31H)

11 2 IR(KBr, cm$^{-1}$): 2800, 2750, 1730, 1718, 1670, 1580

3 Mass: 494(M+)

The compounds of the above type can be obtained by reacting alkanoyl phenol with 4-alkyloxycarbonyl benzoic acid without racemization even in case of a compound having an optical activity. Moreover, the 4-alkyloxycarbonyl benzoic acid is obtained by esterifying a commercially available terephthalic acid dichloride with an alcohol. This esterification is favorable to be carried out by reacting in the presence of a basic reagent such as pyridine, triethylamine or the like under reflux for 1~2 hours.

In the formula (V), compounds of a type having the following formula are concretely exemplified below.

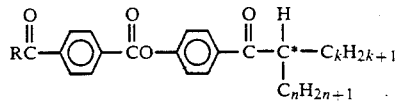

4-(2-methyloctanoyl) phenyl-4-octylcarbonyl benzoic acid ester

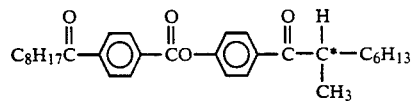

1 $^1$H-NMR (in CDCl$_3$, TMS standard, δ ppm): 8.24~7.29(8H), 3.42(m, 2H), 3.02(t, 2H), 1.90~0.89(31H)

2 IR(KBr, cm$^{-1}$): 2800, 1750, 1735, 1680, 1580

3 Mass: 478(M+)

The compounds of the above type can be obtained by reacting alkanoyl phenol with 4-alkanoyl benzoic acid without racemization even in case of a compound having an optical activity.

Moreover, the above 4-alkanoyl benzoic acid can be produced by reacting benzene fluoride with an acid halide in the presence of an aluminum halide catalyst such as aluminum chloride, aluminum bromide or the like to form 4-alkanoyl fluorobenzene, treating with sodium cyanide, potassium cyanide or the like to form 4-alkanoyl benzonitrile, and then hydrolyzing with an alkali such as potassium hydroxide, sodium hydroxide or the like.

Thirdly, there will be described compounds of the following type in the formula (I):

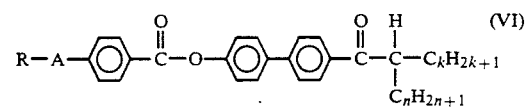

(VI)

(A is anyone of —, —O—,

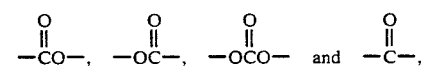

and R is an alkyl group, and each of k and n is an integer of 1 or more provided that k>n).

In general, these compounds can be produced by oxidizing 2-alkyl-1-alkanol to form 2-alkyl-1-alkanoic acid, esterifying it through condensation with hydroxy biphenyl, reacting the resulting ester with an acid halide of 2-alkyl-1-alkanoic acid, hydrolyzing the ester under an alkali condition to form 4-hydroxy-4'-(2-alkylalkanoyl) biphenyl, and esterifying with 4-alkoxy benzoic acid, 4-alkyl benzoic acid, 4-alkyloxycarbonyl benzoic acid, 4-alkanoyloxy benzoic acid, 4-alkanoyl benzoic acid or 4-alkyloxycarbonyloxy benzoic acid.

In the above formula (VI), compounds of a type having the following formula are concretely exemplified below.

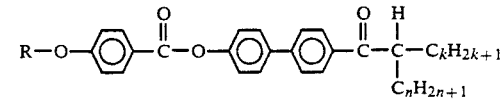

4-octyloxy benzoic acid-4-(2-methylbutanoyl) biphenyl

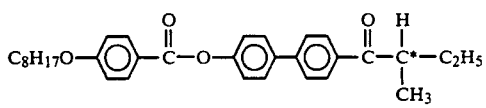

1 $^1$H-NMR(in CDCl$_3$, TMS standard, ppm): 8.15(d, 2H), 8.0(d, 2H), 7.55(d, 4H), 7.27(d, 2H), 6.95(d, 2H), 4.02(t, 2H), 3.50(m, 1H), 2.00~1.20(m, 14H), 1.20(d, 3H), 1.05~0.80(m, 6H)

2 IR(KBr cm$^{-1}$): 2910, 2840, 1725, 1675, 1605

3 Mass: 486(M+)

4-octyloxy benzoic acid-4-(2-methyloctanoyl) biphenyl

1 $^1$H-NMR(in CDCl$_3$, TMS standard, ppm): 8.17(d, 2H), 8.05(d, 2H), 7.70(d, 4H), 7.32(d, 2H), 6.98(d, 2H), 4.05(t, 2H), 3.49(m, 1H), 2.00~1.15(m, 22H), 1.18(d, 3H), 1.0~0.75(m, 6H)

2 IR(KBr cm$^{-1}$): 2910, 2860, 1730, 1680, 1605

3 Mass: 542(M+)

The compounds of the above type can be obtained by reacting 4-hydroxy-4'-(2-alkylalkanoyl) biphenyl with 4-alkyloxy benzoic acid under usual esterification conditions without racemization even in case of a compound having an optical activity.

In the formula (VI), compounds of a type having the following formula are concretely exemplified below.

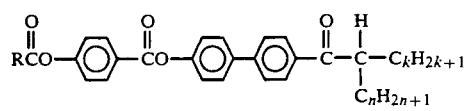

4-decanoyloxy benzoic acid-4-(2-methylbutanoyl) biphenyl

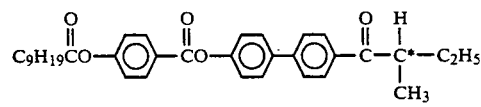

1 $^1$H-NMR(in CDCl$_3$, TMS standard, ppm): 8.24(ABq, 2H), 8.02(ABq, 2H), 7.67(ABq, 4H), 7.31(ABq, 2H), 7.24(ABq, 2H), 3.45(m, 1H), 2.61(t, 3H), 2.05~1.30(m, 16H), 1.24(d, 3H), 0.96(m, 6H)

2 IR(KBr cm$^{-1}$): 2910, 2840, 1740, 1730, 1670, 1600

3 Mass: 528(M+)

4-decanoyloxy benzoic acid-4-(2-methyloctanoyl) biphenyl

1 $^1$H-NMR(in CDCl$_3$, TMS standard, ppm): 8.19(ABq, 2H), 7.98(ABq, 2H), 7.62(ABq, 4H), 7.26(ABq, 2H), 7.20(ABq, 2H), 3.45(m, 1H), 2.61(t, 2H), 2.00~1.25(m, 24H), 1.25(d, 3H), 0.90mm, 6H)

2 IR(KBr cm$^{-1}$): 2910, 2840, 1745, 1735, 1670, 1600

3 Mass: 584(M+)

4-tetradecanoyloxy benzoic acid-4-(2-methyloctanoyl) biphenyl

1 $^1$H-NMR(in CDCl$_3$, TMS standard, ppm): 8.25(d, 2H), 8.10~7.92(m, 2H), 7.75~7.57(m, 4H), 7.35~7.15(m, 4H), 3.48(m, 1H), 2.58(t, 2H), 1.95~1.70(m, 4H), 1.60~1.20(m, 28H), 1.23(d, 3H), 0.88(m, 6H)

2 IR(KBr cm$^{-1}$): 2910, 2840, 1745, 1735, 1675, 1600, 1280, 1070

4-nonanoyloxy benzoic acid-4-(2-methyloctanoyl) biphenyl

1 $^1$H-NMR(in CDCl$_3$, TMS standard, ppm): 8.26(d, 2H), 8.10(d, 2H), 7.70(d, 4H), 7.35(d, 2H), 7.26(d, 2H), 3.47(m, 1H), 2.60(t, 2H), 2.00~1.25(m, 22H), 1.27(d, 3H), 0.87(m, 6H)

2 IR(KBr cm$^{-1}$): 2910, 2840, 1750, 1738, 1675, 1600, 1280, 1215, 1160, 1073

The compounds of the above type can be obtained by reacting 4-hydroxy-4'-(2-alkylalkanoyl) biphenyl with 4-alkanoyloxy benzoic acid or 4-alkyloxycarbonyloxy benzoic acid under usual esterification conditions without racemization even in case of a compound having an optical activity.

In the formula (VI), compounds of a type having the following formula are concretely exemplified below.

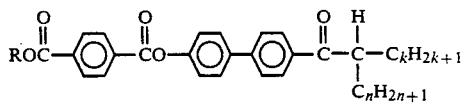

4-(2-methyloctanoyl) biphenyl-4-octyloxycarbonyl benzoic acid ester

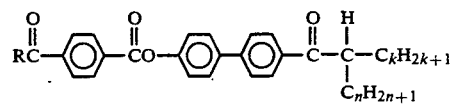

1 $^1$H-NMR(in CDCl$_3$, TMS standard, δ ppm): 8.36~7.26(12H), 4.36(t, 2H), 3.50(m, 1H), 2.00~0.89(m, 31H)

2 IR(KBr cm$^{-1}$): 2800, 2750, 1730, 1712, 1680, 1580

3 Mass: 570(M+)

The compounds of the above type can be obtained by esterification reaction between 4-hydroxy-4'-(2-alkylalkanoyl) biphenyl and 4-alkyloxycarbonyl benzoic acid without racemization even in case of a compound having an optical activity.

In the formula (VI), compounds of a type having the following formula are concretely exemplified below.

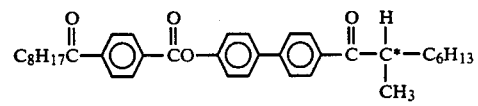

4-(2-methyloctanoyl) biphenyl-4-nonanoyl benzoic acid ester

1 $^1$H-NMR(in CDCl$_3$, TMS standard, δ ppm): 8.20~7.30(12H), 3.50(m, 1H), 3.00(t, 2H), 2.00~0.90(31H)

2 IR(KBr cm$^{-1}$): 2800, 2750, 1735, 1680, 1580

The compounds of the above type can be obtained by esterification reaction between 4-hydroxy-4'-(2-alkylalkanoyl) phenyl and 4-alkanoyl benzoic acid without racemization even in case of a compound having an optical activity.

In the formula (VI), compounds of a type having the following formula are concretely exemplified below.

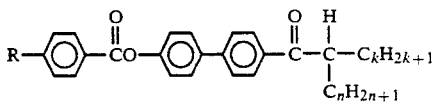

4-octyl benzoic acid-4-(2-methyloctyl) biphenyl

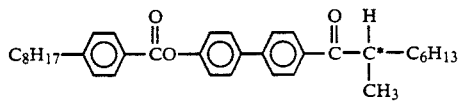

1  $^1$H-NMR(in CDCl$_3$, TMS standard, ppm): 8.12(d, 2H), 8.02(d, 2H), 7.66(d, 4H), 7.30(d, 4H), 3.47(m, 1H), 2.71(t, 2H), 2.00 1.20(m, 22H), 1.23(d, 3H), 0.89(m, 6H)

2  IR(KBr cm$^1$): 2910, 2840, 1725, 1670, 1600, 1461, 1270, 1212, 1055.

The compounds of the above type can be obtained by esterifying 4-hydroxy-4'-(2-alkylalkanoyl) biphenyl with 4-alkyl benzoic acid without racemization even in case of a compound having an optical activity.

Fourthly, there will be described compounds of the following type in the formula (I):

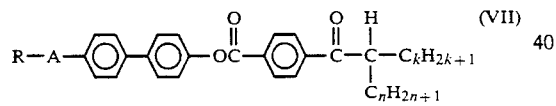

(A is anyone of —, —O—,

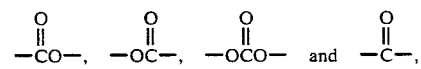

and R is an alkyl group, and each of k and n is an integer of 1 or more provided that k>n).

In general, these compounds can be produced by esterifying 4-alkanoyl benzoic acid with 4-hydroxy-4-'-alkoxy biphenyl, 4-hydroxy-4'-alkanoyloxy biphenyl, 4'-hydroxy-4'-alkyl biphenyl, 4-hydroxy-4'-alkyloxy carbonyl biphenyl, 4-hydroxy-4'-alkyloxycarbonyloxy biphenyl or 4-hydroxy-4'-alkanoyl biphenyl.

In the above formula (VII), compounds of a type having the following formula are concretely exemplified below.

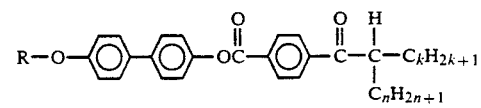

(2-methyloctanoyl) benzoic acid-4-octyloxy biphenyl

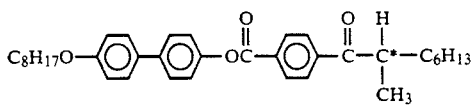

1  $^1$H-NMR(in CDCl$_3$, TMS standard, ppm): 8.27(d, 2H), 8.02(d, 2H), 7.52(t, 4H), 7.23(d, 2H), 6.94(d, 2H), 4.00(t, 2H), 3.46(m, 1H), 2.00~1.20(m, 22H), 1.21(d, 3H), 0.89(m, 6H)

2  KBr cm$^{-1}$): 2910, 2840, 1730, 1678, 1495, 1270, 1215, 1080, 800.

The compounds of the above type can be synthesized by the following method. That is, a commercially available 4-halobenzyl alcohol is reacted with alkylvinyl ether to form 4-halobenzyl-(1-ethoxy) alkyl ether, which is coupled with 2-alkylalkanoic acid chloride through Grignard reaction and then a protective group is removed therefrom to obtain 4-(2-alkylalkanoyl) benzyl alcohol. This alcohol is oxidized with an oxidizing agent such as potassium permanganate or the like to form 4-(2-alkylalkanoyl) benzoic acid, which is esterified with 4-hydroxy-4'-alkyloxy biphenyl obtained by monoalkylation of a commercially available 4,4'-dihydroxy biphenyl, whereby the compound of the above type can be obtained without racemization even in case of a compound having an optical activity.

In the above formula (VII), compounds of a type having the following formula are concretely exemplified below.

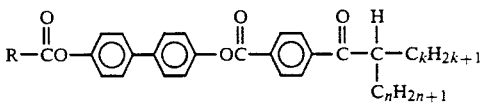

4-(2-methyloctanoyl) benzoic acid-4-nonanoyloxy biphenyl

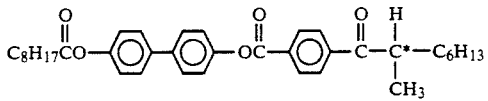

1  $^1$H-NMR(in CDCl$_3$, TMS standard, ppm): 8.33(d, 2H), 8.06(d, 2H), 7.65(d, 2H), 7.60(d, 2H), 7.30(d, 2H), 7.17(d, 2H), 3.46(m, 1H), 2.56(t, 2H), 1.90~1.20(m, 22H), 1.20(d, 3H), 0.85(m, 6H)

2  IR(KBr cm$^{-1}$): 2910, 2840, 1745, 1735, 1680, 1492, 1282, 1225, 1220, 1080, 815.

The compounds of the above type can be obtained by esterifying 4-(2-alkylalkanoyl) benzoic acid with a commercially available 4,4'-dihydroxy biphenyl to form 4-(2-alkylalkanoyl) benzoic acid-4'-hydroxy biphenyl and further esterifying with an alkanoic acid chloride without racemization even in case of a compound having an optical activity.

Fifthly, there will be described compounds of the following type in the formula (I):

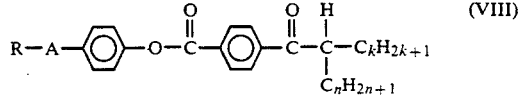

(A is anyone of —, —O—,

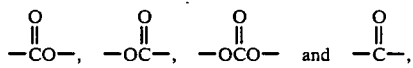

and R is an alkyl group, and each of k and n is an integer of 1 or more provided that k>n).

In general, the compounds can be produced by esterifying 4-alkanoyl benzoic acid with 4-alkoxy phenol, 4-alkyl phenol, 4-alkanoyloxy phenol, 4-alkyloxycarbonyl phenol, 4-alkyloxycarbonyloxy phenol or 4-alkanoyl phenol.

In the above formula (VIII), compounds of a type having the following formula are concretely exemplified below.

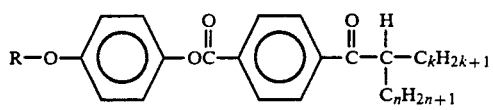

4-(2-methyloctanoyl) benzoic acid-4-octyloxy phenyl

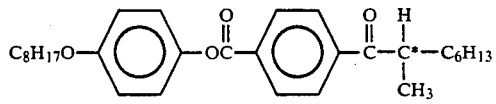

1 H-NMR(in CDCl₃, TMS standard, ppm): 8.24(d, 2H), 7.99(d, 2H), 7.09(d, 2H), 6.88(d, 2H), 3.94(t, 2H), 3.43(m, 1H), 2.00~1.20(m, 22H), 1.20(d, 3H), 0.89(m, 6H)

2 IR(KBr cm$^{-1}$): 2910, 2840, 1732, 1675, 1495, 1455, 1250, 1185, 1070, 817.

4-(2-methyloctanoyl) benzoic acid-4-hexyloxy phenyl

1 $^1$H-NMR(in CDCl₃, TMS standard, ppm): 8.25(d, 2H), 8.00(d, 2H), 7.11(d, 2H), 6.89(d, 2H), 3.96(t, 2H), 3.47(m, 1H), 2.00~1.20(m, 18H), 1.21(d, 3H), 0.90(m, 6H)

2 IR(KBr cm$^{-1}$) 2915, 2840, 1735, 1680, 1512, 1468, 1270, 1200, 1080, 975, 860, 710.

The compounds of the above type can be obtained by esterifying 4-(2-alkylalkanoyl) benzoic acid with 4-alkyloxy phenol without racemization even in case of a compound having an optical activity.

Sixthly, there will be described compounds of the following type in the formula (I):

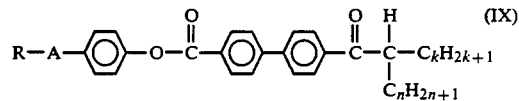

(A is anyone of —, —O—,

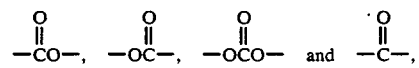

and R is an alkyl group, and each of k and n is an integer of 1 or more provided that k>n).

In general, the compounds can be produced by esterifying 4'-alkanoylbiphenyl-4-carboxylic acid with alkoxy phenol, 4-alkyl phenol, 4-alkanoyloxy phenol, 4-alkyloxycarbonyl phenol, 4-alkyloxycarbonyloxy phenol or 4-alkanoyl phenol.

In the above formula (IX), compounds of a type having the following formula are concretely exemplified below.

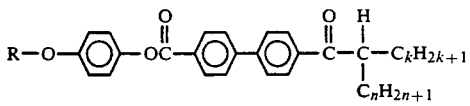

4'-(2-methyloctanoyl) biphenyl-4-carboxylic acid-4-octyloxy phenyl

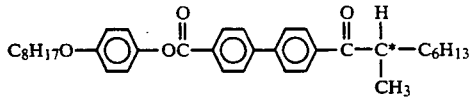

1 $^1$H-NMR(in CDCl₃, TMS standard, ppm): 8.24(d, 2H), 8.03(d, 2H), 7.72(d, 2H), 7.62(d, 2H), 7.11(d, 2H), 6.90(d, 2H), 3.96(t, 2H), 3.50(m, 1H), 2.00~1.20(m, 20H), 1.21(d, 3H), 0.89(m, 6H)

2 IR(KBr cm$^{-1}$): 2910, 2840, 1735, 1675, 1602, 1505, 1275, 1245, 1192, 1075.

The compounds of the above type can be synthesized by the following method. At first, a commercially available 4-halobiphenyl is reacted with acetyl chloride to form 4-acetyl-4'-halobiphenyl, which is oxidized into 4'-halobiphenyl-4-carboxylic acid and reduced with aluminum lithium hydride to form 4'-halo-4-hydroxymethyl biphenyl. Then, this compound is reacted with alkylvinyl ether to form 4-(4-halophenyl) benzyl-(1-alkoxy) ethyl ether, which is coupled with 2-alkylalkanoic acid chloride through Grignard reaction and a protective group is removed under an acidic condition to obtain 4'-(2-alkylalkanoyl)-4-hydroxymethyl biphenyl. Next, this compound is oxidized with an oxidizing agent such as potassium permanganate or the like to form 4'-(2-alkylalkanoyl) biphenyl-4-carboxylic acid and esterified with alkyloxy phenol, whereby the compound of the above type can be obtained without racemization even in case of a compound having an optical activity.

In the above formula (IX), compounds of a type having the following formula are concretely exemplified below.

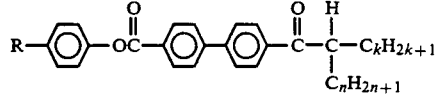

4'-(2-methyloctanoyl) biphenyl-4-carboxylic acid-4-heptyl phenyl

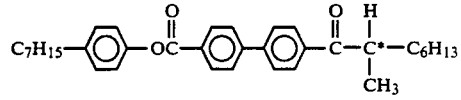

1 $^1$H-NMR(in CDCl₃, TMS standard, ppm): 8.25(d, 2H), 8.09(d, 2H), 7.72(d, 2H), 7.62(d, 2H), 7.29(d, 2H), 7.12(d, 2H), 3.49(m, 1H), 2.70(t, 2H), 2.00~1.20(m, 20H), 1.22(d, 3H), 0.89(m, 6H)

2 IR(KBr cm$^{-1}$): 2910, 2840, 1730, 1675, 1600, 1480, 1275, 1055.

The compound of the above type can be obtained by esterifying 4'-(2-alkylalkanoyl) biphenyl-4-carboxylic acid with 4 alkyl phenol without racemization even in case of a compound having an optical activity.

Moreover, it is a matter of course that the compound of the above formula (!) is used alone or may be used in admixture with another liquid crystalline material.

BRIEF DESCRIPTION OF THE DRAWINGS

FIG. 1 is a phase diagram when 4-(2-methyloctanoyl)phenyl, 4-octyloxy benzoic acid ester and 4-(2-methyloctanoyl) phenyl, 4-tetradecyloxy benzoic acid ester are mixed at various mixing ratios;

FIG. 2 is a phase diagram when 4-(2-methyloctanoyl) phenyl, 4-tetradecylxoy benzoic acid ester and 4-decanoyloxy benzoic acid-4-(2-methyloctanoyl) phenyl are mixed at various mixing ratios; and FIG. 3 is a phase diagram when 4-(2-methyloctanoyl) phenyl, 4-octyloxy benzoic acid ester and 4-decanoyloxy benzoic acid-4-(2-methyloctanoyl) phenyl are mixed at various mixing ratios.

BEST MODE FOR CARRYING OUT THE INVENTION

Alkanoyl phenol compounds

EXAMPLE 1

Synthesis of (+)-4-(2-methylbutanoyl) phenol 3.14 g (74 mmol) of sodium hydroxide and 25.9 g (164 mmol) of potassium permanganate were dissolved into 500 ml of water and held at a temperature of 38°~42° C., to which was added dropwise 10 g (113 mmol) of (−)-2-methylbutyl alcohol through a dropping funnel over 42 minutes with stirring, and further the resulting solution was reacted with stirring for 20 minutes and rapidly cooled in ice water.

Then, the resulting reaction product was washed with ether, rendered into an acidic state by the addition of 3N hydrochloric acid, and extracted with chloroform. This extract was washed with 10% sodium chloride, dried on magnesium sulfate, concentrated and distilled under a reduced pressure (boiling point 96°~98° C./38 mmHg) to obtain 8.92 g of a colorless and transparent liquid compound. This compound was confirmed to be (+)-2-methyl butanoic acid as an analytical result and the yield thereof was 78% (87.3 mmol).

Then, 11.7 g (98.3 mmol) of thionyl chloride was held at a temperature of 36°~38° C. in a flask, to which was added dropwise the above (+)-2-methyl butanoic acid with stirring for 7 minutes. The resulting mixture was reacted at room temperature for 40 minutes and further at a temperature of 80° C. for 30 minutes with stirring. Next, it was distilled to obtain 6.5 g (53.9 mmol, yield 64%) of colorless and transparent (+)-2-methyl butanoic acid chloride.

Thereafter, 78 ml of anhydrous methylene chloride was added to 7.41 g (79 mmol) of phenol and further added with 24.78 g (310 mmol) of aluminum chloride at −12° C. in nitrogen atmosphere, to which was added dropwise 9.95 g (83 mmol) of the above (+)-2-methyl butanoic acid chloride at a temperature of −15° C. and stirred while cooling in an ice salt for 2 hours. The resulting reaction mixture was poured into 1,000 ml of ice water, extracted with methylene chloride, washed with water, dried on magnesiumsulfate, filtered off, and concentrated to obtain 13.80 g of a redish brown liquid of phenyl-2-methyl butanoic acid ester. This phenyl-2-methyl butanoic acid ester was added to 75 ml of methylene chloride and then added with 14.93 g (186 mmol) of aluminum chloride at a temperature of −10° C. in nitrogen atmosphere, which was gradually turned to room temperature and heated under reflux for 4 hours. The thus obtained reaction mixture was poured into 700 ml of ice water, and extracted with chloroform. The extracted organic layer was washed with water, dried on magnesium sulfate, filtered off, concentrated and separated by a column chromatography of silica gel to obtain 5.71 g (32 mmol, yield 41%) of a redish brown liquid of (+)-4-(2-methylbutanoyl) phenol having the aforementioned physical and chemical properties.

EXAMPLE 2

Synthesis of (+)-4-(2-methyldecanoyl) phenol

After 14.6 g of concentrated sulfuric acid and 8.6 g (50 mmol) of (−)-2-methyldecanol were added to 96 ml of water, 16.4 g (10.4 mmol) of potassium permanganate was added dropwise over 4 hours while the reaction temperature was held below 25° C. The thus obtained reaction mixture was poured into 300 ml of ice water, added with 30 g of sodium hydrogen sulfite, adjusted to pH of not more than 1 with hydrochloric acid, extracted with ether and then extracted with a 10% aqueous solution of sodium hydroxide. This extract was added with hydrochloric acid to adjust pH to not more than 1 and again extracted with chloroform. The thus obtained extract was washed with water, dried, concentrated, and distilled under a reduced pressure (0.4 mmHg, 116°~120° C.) to obtain 5.2 g (yield 63%) of (+)-2-metyl decanoic acid.

Then, the same procedure as in Example 1 was repeated except that the above (+)-2-methyl decanoic acid was used instead of (+)-2-methyl butanoic acid to convert this compound into an acid chloride, which was reacted with phenol through aluminum chloride in methylene chloride to obtain (+)-4-(2-methyldecanoyl) phenol having the aforementioned physical and chemical properties at a yield of 40%.

EXAMPLE 3

Synthesis of (+)-4-(2-methyloctanoyl) phenol

After 46.4 g of concentrated sulfuric acid and 21.2 g (147 mmol) of (−)-2-methyloctanol were added to 330 ml of water, 63.4 g (401 mmol) of potassium permanganate was added dropwise over 7.3 hours while the reaction temperature was held at 21°~28° C. The thus obtained reaction mixture was poured into 270 ml of ice water, added with 52 g of sodium hydrogen sulfite, adjusted to pH of not more than 1 with hydrochloric acid, extracted with ether and then extracted with a 10% aqueous solution of sodium hydroxide. This extract was added with hydrochloric acid to adjust pH to not more than 1 and again extracted with chloroform. The extract was washed with water, dried, concentrated and distilled under a reduced pressure (0.28 mmHg, 91°~94° C.) to obtain 15.3 g (yield 64%) of (+)-2-methyl octanoic acid.

Then, 8.93 g (56.4 mmol) of the above (+)-2-methyl octanoic acid was added to 8.98 g (75.5 mmol) of thionyl chloride placed in a flask with stirring at room temperature. Thereafter, the reaction was carried out at room temperature for 10 minutes, at 30° C. for 20 minutes, at 40° C. for 30 minutes and at 70° C. for 2 hours with stirring. After the excessive amount of thionyl chloride was distilled off, there was obtained 9.80 g (55.5 mmol, yield 98%) of light brown (+)-2-methyl octanoic acid chloride.

5.31 g (56.4 mmol) of phenol was added to 50 ml of anhydrous methylene chloride, and 30.0 g (225 mmol) of aluminum chloride was added thereto at −12° C. in a nitrogen atmosphere. Thereafter, 9.80 g (55.5 mmol) of the above (+)-2-methyl octanoic acid chloride was added dropwise while the temperature was held at −13°~−8° C. After the completion of the addition, the resulting mass was gradually turned to room temperature, stirred at a temperature of 35° C. for 1 hour and then heated under reflux for 13 hours. The thus obtained reaction mixture was placed in a container containing 800 ml of 3N aqueous solution of hydrochloric acid, and extracted with chloroform. The organic layer was washed with water, dried on magnesium sulfate, filtered off, concentrated and separated by a column chromatography of silica gel to obtain 5.30 g (22.6 mmol, yield 41%) of a redish brown liquid of (+)-4-(2-methyloctanoyl) phenol having the aforementioned chemical and physical properties.

EXAMPLE 4

Synthesis of (+)-4-(2-methyloctanoyl) anisole

Into a two-necked flask of 10 ml were charged 2.03 g (11.5 mmol) of 2-methyloctanoic acid chloride and 3.0 ml of dried aluminum chloride, to which was added 1.75 g of anhydrous aluminum chloride with stirring at room temperature and dissolved therein by further stirring. Then, the resulting mass was added dropwise to a mixture of 1.23 g (11.3 mmol) of dried anisole and 3.0 ml of dried methylene chloride for 30 minutes while the reaction temperature was held below 6° C. under ice cooling with stirring. Thereafter, the stirring was continued over a night at room temperature.

Then, the reaction mixture was poured in 100 ml of ice water and extracted with 25 ml of methylene chloride twice. The extracted organic layer was washed with water, and dried on magnesium sulfate, filtered, concentrated and separated by a column chromatography of silica gel to obtain 1.84 g (7.4 mmol, yield 65%) of a light yellowish brown oily product of (+)-4-(2-methyloctanoyl) anisole.

EXAMPLE 5

Synthesis of (+)-4-(2-methyloctanoyl) phenol

Into a flask of 50 m were charged 1.84 g (7.4 mmol) of 4-(2-methyloctanoyl) anisole and 35 ml of dried toluene, to which was added 8.68 g of anhydrous aluminum bromide under ice cooling with stirring, and further the stirring was continued at room temperature over a night. Thereafter, the reaction mixture was stirred at 40° C. for 4 hours, cooled to room temperature and poured into 100 ml of ice water. After the extraction with 40 ml of toluene twice, the organic layer was washed with 80 ml of water, dried on magnesium sulfate, filtered, concentrated and distilled under a reduced pressure to obtain 1.70 g (7.3 mmol, yield 98%) of a redish brown and oily (+)-4-(2-methyloctanoyl) phenol.

EXAMPLE 6

Synthesis of (+)-4-(2-methylheptanoyl) phenol

The oxidation with potassium permanganate under an acidic state of sulfuric acid was performed in the same manner as in Example 3 except that (−)-2-methylheptanoyl was used instead of (−)-2 methyloctanol in Example 3 to obtain 2-methylheptanoic acid, which was reacted with thionyl chloride to form (+)-2-methylheptanoic acid chloride. This compound was reacted with phenol in the same manner as in Example 3 to obtain a redish brown liquid of (+)-4-(2-methylheptanoyl)-phenol having the aforementioned physical and chemical properties.

EXAMPLE 7

Synthesis of (+)-4-(2-methylnonanoyl) phenol

The oxidation with potassium permanganate under an acidic state of sulfuric acid was performed in the same manner as in Example 3 except that (−)-2-methylnonanoyl was used instead of (−)-2-methyloctanol in Example 3 to obtain 2-methylnonanoic acid, which was reacted with thionyl chloride to form (+)-2-methylnonanoic acid chloride. This compound was reacted with phenol in the same manner as in Example 3 to obtain a redish brown liquid of (+)-4-(2-methylnonanoyl)phenol having the aforementioned physical and chemical properties.

EXAMPLE 8

Synthesis of (+)-4-(2-ethyloctanoyl)phenol 60 ml of water and 9.12 g of concentrated sulfuric acid were added to 5.12 g (32.3 mmol) of (−)-2-ethyl-1-octanol, to which was slowly added 9.96 g (63.0 mmol) of potassium permanganate while the reaction temperature was held at 22°~28° C. with stirring. Thereafter, the reaction mixture was added with 50 ml of ether, 10.2 ml of sodium hydrogen sulfite and 30 ml of ice water, which was poured into 60 ml of ice water and extracted with ether. From this ether layer was extracted 2-ethyloctanoic acid with a 10% aqueous solution of sodium hydroxide.

After this aqueous layer was added with 30 ml of concentrated hydrochloric acid to adjust pH to not more than 1, 2-ethyloctanoic acid was extracted with chloroform. This organic layer was dried on magnesium sulfate, filtered off and distilled under a reduced pressure (107°~111° C./1.1 mmHg) to obtain 2.92 g (yield 52%) of (+)-2-ethyloctanoic acid.

Then, 2.72 g (15.8 mmol) of the above (+)-2-ethyloctanoic acid and 2.48 g (20.8 mmol) of thionyl chloride were charged into a flask and reacted at a temperature of 27° C. for 20 minutes, at 40° C. for 50 minutes, at 60° C. for 50 minutes and at 80° C. for 2 hours with stirring. Thereafter, the resulting mass was distilled to obtain 3.09 g of a light brown liquid of (+)-2-ethyloctanoic acid chloride having a specific rotation $[\alpha]^{25}$ of +4.5.

1.47 g (15.6 mmol) of phenol was added to 12.2 ml of anhydrous methylene chloride and cooled in a bath of ice salt to hold a temperature at −15°~−8° C., to which was added 8.24 g (61.8 mmol) of anhydrous aluminum chloride. Then, 2.95 g (15.7 mmol) of the above (+)-2-ethyloctanoic acid chloride was added dropwise to the resulting mass while being held at a temperature of −14°~−7° C. and warmed to a temperature of 38° C. to conduct the reaction for 7 hours. To the resulting reaction mixture were added 60 ml of water and 70 ml of chloroform, which was poured into a solution of 14 ml of concentrated hydrochloric acid in 100 ml of ice water. The resulting product was extracted with chloroform, washed with water, dried on magnesium sulfate, filtered off, and concentrated to obtain 3.78 g of a redish brown liquid. This liquid was separated by a column chromatography of silica gel and a thin layer chromatography to obtain 1.08 g (purity 84%, yield 46%) of a redish brown liquid of (+)-4-(2-ethyloctanoyl) phenol having the aforementioned physical and chemical properties.

EXAMPLE 9

Synthesis of (+)-4-(2-propyldecanoyl) phenol

Instead of (−)-2-ethyl-1-octanol in Example 8, 5.07 g (25.3 mmol) of (−)-2-propyl-1-decanol was used and then oxidized with potassium permanganate under the same acidic state of sulfuric acid as in Example 6 to obtain 2-propyl decanoic acid. 2.19 g (10.2 mmol) of this compound was reacted with 1.75 g (14.7 mmol) of thionyl chloride under the same conditions as in Example 8 to obtain 2.39 g of a light brown liquid of (+)-2-propyldecanoic acid chloride having a specific rotation $[\alpha]^{25}$ of +1.63.

Then, the same procedure as in Example 8 was repeated except that 2.33 g (9.36 mmol) of the above (+)-2-propyldecanoic acid chloride was used instead of (+)-2-ethyloctanoic acid chloride. As a result, there was obtained 0.77 g of a high viscosity and redish brown (+)-4-(2-propyldecanoyl)phenol having the aforementioned physical and chemical properties.

4-hydroxy-4'-(2-alkylalkanoyl) biphenyl compounds

EXAMPLE 10

Synthesis of(+)-4-hydroxy-4'-(2-methylbutanoyl) biphenyl 5.49 g of (+)-2-methylbutanoic acid, 8.50 g of 4-hydroxy biphenyl and 20 ml of toluene were charged into a flask and then 4.0 ml (55 mmol) of thionyl chloride was added thereto with stirring. The resulting mixture was maintained at a temperature of 70°~80° C. and reacted for 8 hours. After the completion of the reaction, the resulting product was cooled to room temperature, added with water to decompose the excess amount of thionyl chloride, washed with water and dried on anhydrous magnesium sulfate. After the removal of solvent, it was purified by a column chromatography of silica gel to obtain 12.69 g of (+)-2-methylbutanoic acid biphenyl having an oily specific rotation $[\alpha]^{25}$ (16.46 wt% in chloroform) of +15.1°.

Then, 4.0 g of (+)-2-methylbutanoic acid chloride and 7 ml of nitrobenzene were charged into a flask and cooled to 0° C., to which was added 10.74 g (80 mmol) of aluminum chloride with stirring and further added a solution of 4.97 g (19.6 mmol) of (+) 2-methylbutanoic acid-4-biphenyl in 9 ml of nitrobenzene and then stirred at room temperature for 70 hours. Thereafter, the resulting mixture was added with 2 normal hydrochloric acid and ice and extracted with chloroform. The chloroform layer was washed with water, dried on anhydrous magnesium sulfate, and purified by a column chromatography of silica gel after the distillation off of the solvent to obtain 3.60 g (yield 54%) of oily 2-methylbutanoic acid-4-(2-methylbutanoyl) biphenyl. The NMR analytical values of this purified product were as follows.

$^1$H-NMR (in CDCl$_3$, TMS standard, ppm): 8.02(d, 2H), 7.63(d, 2H), 7.60(d, 2H), 7.20(d, 2H), 3.42(m, 1H), 2.67(m, 1H), 1.75 1.95(m, 2H), 1.4~1.75(m, 2H), 1.32(d, 3H), 1.20(d, 3H), 1.06(t, 3H), 0.96(t, 3H)

0.67 g of the above 2-methylbutanoic acid-4-(2-methylbutanoyl) biphenyl was mixed with 95 ml of methyl alcohol and 5 ml of water and added with 1.14 g (13.6 mmol) of sodium hydrogen carbonate with stirring, which was subjected to hydrolysis reaction at room temperature for 40 hours. After the completion of the reaction, methanol was distilled off and 1 normal hydrochloric acid was added to adjust pH to not more than 1, and the extraction with dichloromethane was performed. The extracted liquid was washed with water, dried on anhydrous sodium sulfate and purified by a column chromatography of silica gel after the removal of the solvent to obtain 0.44 g (yield 88%) of (+)-4-hydroxy-4'-(2-methylbutanoyl) biphenyl at a light yellow crystal having the aforementioned properties.

EXAMPLE 11

Synthesis of (+)-4-hydroxy-4'-(2-methyloctanoyl) biphenyl

To 21.2 g (147 mmol) of (−)-2-methyloctanol were added 330 ml of water and 46.4 g of concentrated sulfuric acid with stirring to form an emulsion. To this emulsion was added dropwise 63.4 g (401 mmol) of potassium permanganate over 7 hours. The reaction liquid was added with 51.5 g of sodium hydrogen sulfite, 70 ml of ice water and 200 ml of ether and poured into 270 ml of ice water. After the separation of two layers, the reaction product was extracted from water layer with ether and further with a 10% aqueous solution of sodium hydroxide, which was added with ice and further with concentrated sulfuric acid to adjust pH to not more than 1. The reaction product was extracted from the water layer with chloroform, washed with water, dried on magnesium sulfate and filtered off, and then the filtrate was concentrated and distilled under a reduced pressure to obtain 16.5 g (yield 71%) of a colorless and transparent liquid of (+)-2-methyloctanoic acid.

Then, 2.38 g (19.0 mmol) of thionyl chloride was charged into a flask and maintained at a temperature of 36°~38° C., to which was added dropwise 2.15 g (15.9 mmol) of the above (+)-2-methyloctanoic acid in 7 minutes with stirring. The resulting mixture was stirred at room temperature for 40 minutes and at a temperature of 80° C. for 30 minutes. Then, the reaction product was distilled to obtain 2.81 g (15.9 mmol, yield 100%) of a colorless and transparent (+)-2-methyloctanoic acid chloride.

Next, 2.02 g (11.4 mmol) of the above (+)-2-methyloctanoic acid chloride and 3 ml of nitrobenzene were charged into a flask, and cooled to 0° C., to which was added 3.06 g (22.9 mmol) of anhydrous aluminum chloride with stirring and then the resulting mixture was stirred at room temperature for 30 minutes. This mixture was added with a solution of 2.89 g (7 mmol) of (+)-2-methyloctanoic acid biphenyl dissolved in 3 ml of nitrobenzene, which was reacted at room temperature for 140 hours with stirring. After the completion of the reaction, 2N hydrochloric acid and ice were added, and the extraction with chloroform was carried out, and the extract was washed with water, dried on anhydrous magnesium sulfate, distilled to remove the solvent, and purified by a column chromatography of silica gel to obtain 1.55 g (yield 49%) of an oily (+)-2-methyloctanoic acid-4-(2-methyloctanoyl) biphenyl.

0.85 g (1.9 mmol) of the above 2-methyloctanoic acid-4-(2-methyloctanoyl) biphenyl was added with 70 ml of methyl alcohol and 5 ml of water and further with 0.98 g (11.7 mmol) of sodium hydrogen carbonate with stirring, which was reacted at room temperature for 46 hours. After the completion of the reaction, methanol was removed out, and 1 normal hydrochloric acid was added to adjust pH to not more than 1, and the extraction with dichloromethane was carried out. The extract was washed with water, dried on anhydrous magnesium sulfate, distilled to remove the solvent, and purified by a column chromatography of silica gel to obtain 0.54 g (yield 92%) of a light yellow crystal of (+)-4-hydroxy-4'-(2-methyloctanoyl) biphenyl having the aforementioned physical and chemical properties.

Alkanoyl ester compounds

EXAMPLE 12

Synthesis of 4'-octyloxybiphenyl-4-carboxylic acid

A solution of 50 g of sodium hydroxide dissolved in 240 ml of a mixed solvent of water-ethanol was added with 10 g (32 mmol) of a commercially available 4'-octyloxy-4-cyanobiphenyl, which was reacted by heating under reflux for 3 hours. The reaction mixture was acidified with hydrochloric acid, filtered off and recrystallized with a solvent of ethanol-acetic acid to obtain a solid product. As a result of an infrared spectrum analysis of this product, absorptions were recognized at 3,400 cm$^{-1}$, 3,200 cm$^{-1}$, 2,950~2,850 cm$^{-1}$, 1,650 cm$^{-1}$ and 1,600 cm$^{-1}$, respectively, from which it was confirmed to be 4'-octyloxybiphenyl-4-carboxylic acid.

Synthesis of 4-(2-methylbutanoyl) phenyl, 4'-octyloxybiphenyl-4-carboxylic acid

To 1.8 g (5.5 mmol) of the above 4'-octyloxybiphenyl-4-carboxylic acid was added 20 ml of thionyl chloride, which was reacted by heating under reflux for 3 hours and then the excess amount of thionyl chloride was distilled off under a reduced pressure to obtain an oily acid chloride. To this chloride was added dropwise a solution of 1 g (5.6 mmol) of (+)-4-(2-methylbutanoyl)phenol dissolved in 5 ml of dried pyridine under ice cooling.

After the completion of the addition, the mixture was reacted at room temperature for 24 hours, and extracted with water and further with chloroform. After the drying and concentration, the recrystallization was carried out to obtain 120 mg (0.25 mmol) of a solid crystal.

As a result of the analysis of the thus obtained compound, it was confirmed to be 4-(2-methylbutanoyl) phenyl, 4'-octyloxybiphenyl-4-carboxylic acid ester having the aforementioned physical and chemical properties.

Evaluation of liquid crystal properties

As a result that the change of texture of the above compound was observed by using a polarlized microscope provided with a hot stage, it was a liquid crystal state of chiralsmectic C phase at 74.5° C., changed into a liquid crystal of smectic A phase at 131.0° C. and was finally an isotropic liquid at 187.0° C. during the heating. On the other hand, during the cooling, it was a liquid crystal state of smectic A phase at 185.6° C., changed into liquid crystals of chiralsmectic C phase at 130.0° C. and highly smectic phase at 68.0° C. and was finally a solid crystal at 51.2° C.

Further, after the above compound was encapusled in a rubbing cell coated with a polyimide of 3 μm in thickness, the spontaneous polarization at 75° C. was measured by applying an alternating current through a triangle wave method, and consequently the compound showed a large spontaneous polarization of 138 nC/cm$^2$.

EXAMPLE 13

Synthesis of 4-(2-methyldecanoyl)phenyl, 4'-octyloxybiphenyl-4-carboxylic acid ester To a mixture of 450 mg (1.4 mmol) of 4'-octyloxybiphenyl-4-carboxylic acid, 350 mg (1.4 mmol) of (+)-4-(2-methyldecanoyl) phenol and 10 mg of 4-dimethylamino pyridine in 5 ml of methylene chloride was added 275 mg (1.4 mmol) of N,N'-dicyclohexylcarbodiimide. The resulting mixture was heated under reflux for 4 hours and filtered, and then the filtrate was extracted with methylene chloride, washed with water, dried on magnesium sulfate, filtered off, concentrated, and recrystallized with ethanol to obtain white 4-(2-methyldecanoyl) phenyl, 4'-octyloxybiphenyl-4-carboxylic acid ester having the aforementioned properties.

Evaluation of liquid crystal properties

The liquid crystal properties of this compound were observed by the same method as in Example 12. It was a liquid crystal state of ferroelectric phase at 59.0° C., changed into a liquid crystal of smectic A phase at 124.0° C. and was finally an isotropic liquid at 152.0° C. during the heating. On the other hand, it was a liquid crystal state of smectic A phase at 150.7° C., changed into a liquid crystal of chiralsmectic C phase at 125° C. and was finally a solid crystal at 58.0° C. during the cooling.

As a result that the spontaneous polarization was measured by the same method as in Example 12, it showed a large spontaneous polarization of 210 nC/cm$^2$ at 60° C.

EXAMPLE 14

Synthesis of 4-(2-methylbutanoyl) phenyl, 4'-dodecyloxybiphenyl-4-carboxylic acid ester In the synthesis of 4'-octyloxybiphenyl-4-carboxylic acid of Example 12, the hydrolysis was repeated in the same manner as in Example 12 except that 4'-dodecyloxy-4-cyanobiphenyl was used instead of 4'-octyloxy-4-cyanobiphenyl to obtain 4'-dodecyloxybiphenyl-4-carboxylic acid. This 4'-dodecyloxybiphenyl-4-carboxylic acid was condensed with 4-(2-methylbutanoyl) phenyl in the same manner as in the synthesis of 4-(2-methyldecanoyl) phenyl, 4'-octyloxybiphenyl-4-carboxylic acid ester of Example 13 to synthesize 4-(2-methylbutanoyl) phenyl, 4'-dodecyloxybiphenyl-4-carboxylic acid ester having the aforementioned physical and chemical properties.

Evaluation of liquid crystal properties

The liquid crystal properties of this compound were observed by the same method as in Example 12. It was a liquid crystal state of ferroelectric phase at 68.0° C., changed into a liquid crystal of smectic A phase at 107.0° C. and was finally an isotropic liquid at 178.0° C. during the heating. On the other hand, it was a liquid crystal state of smectic A phase at 177.0° C., changed into liquid crystals of chiralsmectic C phase at 105.0° C. and other ferroelectric phase at 64.0° C. and was finally a solid crystal at 57.0° C. during the cooling.

As a result that the spontaneous polarization was measured by the same method as in Example 12, it showed a large spontaneous polarization of 100 nC/cm² at 65° C.

EXAMPLE 15

Synthesis of 4-(2-methyloctanoyl) phenyl, 4'-octyloxybiphenyl-4-carboxylic acid ester 4'-octyloxybiphenyl-4-carboxylic acid and (+)-4-(2-methyloctanoyl) phenol were condensed in the same manner as in the synthesis of 4-(2-methyldecanoyl) phenyl, 4-'-octyloxybiphenyl-4-carboxylic acid ester of Example 13, and filtered, and then the filtrate was extracted with methylene chloride, which was washed with water, dried on magnesium sulfate, filtered off, concentrated and recrystallized with ethanol to obtain 4-(2-methyloctanoyl) phenyl, 4'-octyloxybiphenyl-4-carboxylic acid ester having the aforementioned properties (yield 30%).

Evaluation of liquid crystal properties

The liquid crystal properties of this compound were observed by the same method as in Example 12. It was a liquid crystal state of ferroelectric phase at 50.0° C., changed into liquid crystals of chiralsmectic C phase at 76.0° C. and smectic A phase at 132.0° C. and was finally an isotropic liquid at 150.0° C. during the heating. On the other hand, it was a liquid crystal state of smectic A phase at 150.0° C., changed into liquid crystals of chiralsmectic C phase at 132.0° C. and other ferroelectric phase at 60.0° C. and was finally a solid crystal at 26.0° C. during the cooling.

As a result that the spontaneous polarization was measured by the same method as in Example 12, it showed large spontaneous polarizations of 293 nC/cm² (30 Vpp, 100 Hz) at 62° C. and 403 nC/cm² (70 Vpp, 5 Hz) at 39° C.

EXAMPLE 16

Synthesis of 4-(2-methylheptanoyl) phenyl, 4'-octyloxybiphenyl-4-carboxylic acid ester 4'-octyloxybiphenyl-4-carboxylic acid and (+)-4-(2-methylheptanoyl) phenol were condensed in the same manner as in the synthesis of 4-(2-methyldecanoyl) phenyl, 4'-octyloxybiphenyl-4-carboxylic acid ester of Example 13 to obtain (−)-4 (2-methylheptanoyl) phenyl, 4'-octyloxybiphenyl-4-carboxylic acid ester having the aforementioned properties.

Evaluation of liquid crystal properties

The liquid crystal properties of this compound were observed by the same method as in Example 12. It was a liquid crystal state of ferroelectric phase at 65.0° C., changed into liquid crystals of chiralsmectic C phase at 71.0° C. and smectic A phase at 137.0° C. and was finally an isotropic liquid at 156.5° C. during the heating. On the other hand, it was a liquid crystal state of smectic A phase at 155.9° C., changed into liquid crystals of chiralsmectic C phase at 136.0° C. and other ferroelectric phase at 60.1° C. and was finally a solid crystal at 29.1° C. during the cooling.

As a result that the spontaneous polarization was measured by the same method as in Example 12, it showed a large spontaneous polarization of 301 nC/cm² (30 Vpp, 100 Hz) at 65° C.

EXAMPLE 17

Synthesis of 4-(2-methylnonanoyl) phenyl, 4'-hexyloxybiphenyl-4-carboxylic acid ester In the synthesis of 4'-octyloxybiphenyl-4-carboxylic acid of Example 12, the same hydrolysis as in Example 12 was repeated except hat 4'-hexyloxy-4-cyanobiphenyl was used instead of 4'-octyloxy-4-cyanobiphenyl to obtain 4'-hexyloxybiphenyl-4-carboxylic acid. This 4'-hexyloxybiphenyl-carboxylic acid was condensed with (+)-4-(2-methylnonanoyl) phenol in the same manner as in the synthesis of 4-(2-metylnonanoyl) phenyl, 4'-octyloxybiphenyl-4-carboxylic acid ester of Example 13 to synthesize 4-(2-methylnonanoyl) phenyl, 4'-hexyloxybiphenyl-4-carboxylic acid ester having the aforementioned physical and chemical properties.

Evaluation of liquid crystal properties

The liquid crystal properties of this compound were observed by the same method as in Example 12. It was a liquid crystal state of smectic A phase at 115° C. and was finally an isotropic liquid at 1150° C. during the heating. On the other hand, it was a liquid crystal state of smectic A phase at 150° C., changed into a liquid crystal of chiralsmectic C phase at 110° C. and was finally a solid crystal at 85° C. during the cooling.

As a result that the spontaneous polarization was measured by the same method as in Example 12, it showed 136.7 nC/cm² (30 Vpp, 100 Hz) at 90° C.

EXAMPLE 18

Synthesis of 4-(2-methylnonanoyl) phenyl, 4'-octyloxybiphenyl-4-carboxylic acid ester 4'-octyloxybiphenyl-4-carboxylic acid and (+)-4-(2-methylnonanoyl) phenol were condensed in the same manner as in the synthesis of 4-(2-methyldecanoyl) phenyl, 4'-octyloxybiphenyl-4-carboxylic acid ester of Example 13 to obtain 4-(2-methylnonanoyl) phenyl, 4'-octyloxybiphenyl-4-carboxylic acid ester having the aforementioned properties.

Evaluation of liquid crystal properties

The liquid crystal properties of this compound were observed by the same method as in Example 12. It was a liquid crystal state of ferroelectric phase at 57.5° C., changed into liquid crystals of chiralsmectic C phase at 67.6° C. and smectic A phase at 124.0° C. and was finally an isotropic liquid at 144.5° C. during the heating. On the other hand, it was a liquid crystal state of smectic A phase at 142.8° C., changed into liquid crystals of chiralsmectic C phase at 122.0° C. and other ferroelectric phase at 55.3° C. and was finally a solid crystal at 28.0° C. during the cooling.

As a result that the spontaneous polarization was measured by the same method as in Example 12, it showed a very large spontaneous polarization of 272.2 nC/cm² (30 Vpp, 100 Hz) at 65° C.

EXAMPLE 19

Synthesis of 4-(2-methylnonanyol) phenyl, 4'-nonyloxybiphenyl-4-carboxylic acid ester In the synthesis of 4'-octyloxybiphenyl-4-caboxylic acid of Example 12, the same hydrolysis as in Example 12 was repeated except that 4'-nonyloxy-4-cyanobiphenyl was used instead of 4'-octyloxy-4-cyanobiphenyl to obtain 4'-nonyloxybiphenyl-4-carboxylic acid. This 4'- nonyloxybiphenyl-4-carboxylic acid was condensed with 4-(2-methylnonanoyl) phenol in the same manner as in the synthesis of 4-(2-methylnonanoyl) phenyl, 4'-octyloxybiphenyl-4-carboxylic acid ester of Example 13 to synthesize 4-(2-methylnonanoyl)phenyl, 4'-nonyloxybiphenyl-4-carboxylic acid ester having the aforementioned physical and chemical properties.

Evaluation of liquid crystal properties

The liquid crystal properties of this compound were observed by the same method as in Example 12. It was a liquid crystal state of ferroelectric phase at 38.6° C., changed into liquid crystals of chiralsmectic C phase at 56.2° C. and smectic A phase at 118.0° C. and was finally an isotropic liquid at 141.7° C. during the heating. On the other hand, it was a liquid crystal state of smectic A phase at 140.6° C., changed into liquid crystals of chiralsmectic C phase at 177.0° C. and other ferroelectric phase at 48.2° C. and was finally a solid crystal at 28.0° C. during the cooling.

As a result that the spontaneous polarization was measured by the same method as in Example 12, it showed a very large spontaneous polarization of 303.9 nC/cm² (30 Vpp, 100 Hz) at 50° C.

EXAMPLE 20

Synthesis of 4-(2-methylnonanoyl) phenyl, 4'-dodecyloxybiphenyl-4-carboxylic acid ester 4'-dodecyloxybiphenyl-4-carboxylic acid and (+)-4-(2-methylnonanoyl) phenol were condensed in the same manner as in the synthesis of 4-(2-methyldecanoyl) phenyl, 4'-octyloxybiphenyl-4-carboxylic acid ester of Example 13 to obtain 4-(2-methylnonanoyl) phenyl, 4'-dodecyloxybiphenyl-4-carboxylic acid ester having the aforementioned properties.

Evaluation of liquid crystal properties

The liquid crystal properties of this compound were observed by the same method as in Example 12. It was a liquid crystal state of ferroelectric phase at 65.0° C., changed into liquid crystals of chiralsmectic C phase at 75.0° C. and smectic A phase at 112.0° C. and was finally an isotropic liquid at 126.0° C. during the heating. On the other hand, it was a liquid crystal state of smectic A phase at 125.0° C., changed into a liquid crystal of chiralsmectic C phase at 112.0° C. and was finally a solid crystal at 54.5° C. during the cooling.

As a result that the spontaneous polarization was measured by the same method as in Example 12, it showed 217.2 nC/cm² (30 Vpp, 100 Hz) at 60° C.

EXAMPLE 21

Synthesis of 4-(2-ehtyloctanoyl) phenyl, 4'-octyloxybiphenyl-4-carboxylic acid ester.

To a mixture of 660 mg (2.0 mmol) of 4'-octyloxybiphenyl-4-carboxylic acid, 500 mg (2.0 mmol) of (+)-4-(2-ethyloctanoyl) phenol and 20 mg of 4-dimethylamino pyridine in 10 ml of methylene chloride was added 500 mg (2.4 mmol) of N,N'-dicyclohexyl-carbodiimide. The resulting mass was reacted by heating under reflux for 4 hours and filtered, and then filtrate was extracted with methylene chloride, washed with water and dried. After the concentration, the product was isolated by a column chromatography to obtain 210 mg (0.38 mmol) of a solid crystal.

As a result of the analysis of the thus obtained compound, it had been confirmed that the compound was 4-(2-ethyloctanoyl) phenyl, 4'-octyloxybiphenuyl-4-carboxylic acid ester having the aforementioned physical and chemical properties.

Evaluation of liquid crystal properties

As to the liquid crystal properties of this compound, the change of the texture was observed by the same method as in Example 12. It was a liquid crystal state of ferroelectric phase at 64.8° C., changed into liquid crystals of chiralsmectic C phase at 69.8° C. and smectic A phase at 103.3° C. and was finally an isotropic liquid at 113.3° C. during the heating (+2° C./min). On the other hand, it was a liquid crystal state of smectic A phase at 114.2° C., changed into liquid crystals of chiralsmectic C phase at 102.6° C. and other ferroelectric phase at 67.2° C. and was finally a solid crystal at 44.1° C. during the cooling.

As a result that the spontaneous polarization was measured by the same method as in Example 12, it showed 139 nC/cm² at 67.6° C.

EXAMPLE 22

Synthesis of (+)-4-(2-propyldecanoyl) phenyl, 4'-octyloxybiphenyl-4-carboxylic acid ester In the synthesis of 4-(2-ethyloctanoyl) phenyl, 4-'-octyloxybiphenyl-4-carobyxlic acid ester of Example 21, the same procedure was repeated except that (+)-4-(2-propyldecanoyl) phenol was used instead of (+)-4-(2-ethyloctanoyl) phenol to obtain 4-(2-propyldecanoyl) phenyl, 4'-octyloxybiphenyl-4-carboxylic acid ester having the aforementioned physical and chemical properties.

Evaluation of liquid crystal properties

The liquid crystal properties of this compound were observed by the same method as in Example 12. It was a liquid crystal state of ferroelectric phase at 22.0° C., changed into liquid crystals of chiralsmectic C phase at 27.0° C. and smectic A phase at 66.2° C. and was finally an isotropic liquid at 83° C. during the heating. On the other hand, it was a liquid crystal state of smectic A phase at 85.0° C., changed into liquid crystals of chiralsmectic C phase at 69.9° C. and other ferroelectric phase at 27.0° C. and was finally a solid crystal at 17.6° C. during the cooling.

EXAMPLE 23

Synthesis of 4-decanoyloxybiphenyl-4'-carboxylic acid 1.5 g (7 mmol) of 4-hydroxybiphenyl-4'-carboxylic acid obtained by alkali hydrolysis of 4-hydroxy-4'-cyanobiphenyl was added with 10 ml of dried pyridine, to which was added dropwise 1.4 g (7 mmol) of decanoic acid chloride. After the reaction for 1 hour with stirring, the product was extracted with toluene-water. This toluene layer was acidified, and the precipitated solid was recrystallized with ethyl alcohol to obtain 1.0 g (2.7 mmol, yield 36%) of a white solid of 4-decanoyloxybiphenyl-4'-carboxylic acid having infrared absorption spectra at 1,745 cm⁻¹, 1,680 cm⁻¹ and 1,600 C⁻¹.

Synthesis of 4-(2-methyloctanoyl) phenyl, 4'-decanoyloxybiphenyl-4-carboxylic acid ester To 10 ml of methylene chloride were added 250 mg (0.68 mmol) of the above 4-decanoyloxybiphenyl-4'-carboxylic acid, 300 mg (1.28 mmol) of 4-(2-methyloctanoyl) phenol and 20 mg of 4-dimethylamino pyridine, which was added with 200 mg (0.68 mmol) of N,N'-dicylohexylcarbodiimide. The resulting mixture was heated under reflux for 2 hours and filtered, and then the filtrate was extracted with methylene chloride, washed with water and dried. This methylene chloride solution was filtered off, concentrated and isolated by a column chromatography to obtain 100 mg (0.17 mmol, yield 25%) of white 4-(2-methyloctanoyl) phenyl, 4'-decanoyloxybiphenyl-4-carboxylic acid ester having the aforementioned physical and chemical properties.

Evaluation of liquid crystal properties

As to the liquid crystal properties of this compound, the change of the texture was observed by the same method as in Example 12. It was a liquid crystal state of ferroelectric phase at 66.0° C., changed into liquid crystals of chiralsmectic C phase at 76.0° C. and smectic A phase at 120.1° C. and was finally an isotropic liquid at 154.2° C. during the heating. On the other hand, it was a liquid crystal state of smectic A phase at 157.3° C., changed into liquid crystals of chiralsmectic C phase at 117.1° C. and other ferroelectric phase at 57.6° C. and was finally a solid crystal at 38.0° C. during the cooling.

As a result that the spontaneous polarization was measured by the same method as in Example 12, it showed 180 nC/cm$^2$ at 62.1° C.

EXAMPLE 24

Synthesis of 4-octyloxycarbonyloxybiphenyl-4'-carboxylic acid

In the synthesis of 4-decanoyloxybiphenyl-4'-carboxylic acid of Example 23, the same procedure was repeated except that octylformic acid chloride was used instead of decanoic acid chloride to obtain 4-octyloxycarbonyloxybiphenyl-4,-carboxylic acid having infrared absorption spectra at 1,760 cm$^{-1}$, 1,680 cm$^{-1}$ and 1,600 cm$^{-1}$.

Synthesis of 4-(2-methyloctanoyl) phenyl, 4'-octyloxycarbonyloxybiphenyl-4-carboxylic acid ester In the synthesis of 4-(2-methyloctanoyl) phenyl, 4'-decanoyloxybiphenyl-4-carboxylic acid ester of Example 23, the same procedure was repeated except that the above 4-octyloxycarbonyloxybiphenyl-4'-carboxylic acid was used instead of 4-decanoyloxybiphenyl-4'-carboxylic acid to obtain 4-(2-methyloctanoyl) phenyl, 4'-octyloxycarbonyloxybiphenyl-4-carboxylic acid ester having the aforementioned physical and chemical properties.

Evaluation of liquid crystal properties

The liquid crystal properties of this compound were observed by the same method as in Example 12. It was a liquid crystal state of ferroelectric phase at 28.3° C., changed into liquid crystals of chiralsmectic C phase at 39.5° C. and smectic A phase at 104.5° C. and was finally an isotropic liquid at 147.3° C. during the heating. On the other hand, it was a liquid crystal state of smectic A phase at 146.8° C., changed into liquid crystals of chiralsmectic C phase at 106.5° C. and other ferroelectric phase at 37.5° C. and was finally a solid crystal at 10.0° C. during the cooling.

As a result that the spontaneous polarization was measured by the same method as in Example 12, it r showed 207 nC/cm$^2$ at 46.5° C.

EXAMPLE 25

Synthesis of 4-(2-methyloctanoyl) phenyl, 4'-nonylbiphenyl-4-carboxylic acid ester To 40 ml of methylene chloride were added 500 mg (1.5 mmol) of 4'-nonylbiphenyl-4-carboxylic acid obtained by hydrolysis of commercially available 4'-nonyl-4-cyanobiphenyl, 270 mg (1.2 mmol) of 4-(2-methyloctanoyl) phenol and 4-dimethylamino pyridine, and the resulting mixture was added with 300 mg (1.5 mmol) of N,N'-dicyclohexylcarbodiimide. After this mixture was left to stand at room temperature over a night, the solid product was filtered off, and the filtrate was concentrated. The residue was isolated by a column chromatography to obtain 380 mg (0.7 mmol, 47%) of white 4-(2-methyloctanoyl) phenyl, 4'-nonylbiphenyl-4-carboxylic acid ester having the aforementioned properties.

Evaluation of liquid crystal properties

The liquid crystal properties of this compound were observed by the same method as in Example 12. It was a liquid crystal state of chiralsmectic C phase at 74.5° C. during the heating. On the other hand, it was a liquid crystal state of smectic A phase at 116° C., changed into a liquid crystal of chiralsmectic C phase at 98.6° C. and was finally a solid crystal at 56° C. during the cooling.

As a result that the spontaneous polarization was measured by the same method as in Example 12, it showed 183 nC/cm$^2$ at 63.6° C.

EXAMPLE 26

Synthesis of 4-octyloxy benzoic acid

Into a flask of 500 ml were charged 15.6 g of sodium hydroxide, 80 ml of water and 160 ml of ethanol, to which was added and dissolved 24.8 g (0.18 mmol) of 4-hydroxy benzoic acid. Then, the resulting mixture was added with 37.1 g (0.18 mmol) of bromooctane and heated under reflux for 4 hours with stirring. Thereafter, the reaction mixture was cooled and rendered into pH of not more than 2 by the addition of hydrochloric acid to precipitate a solid, which was filtered off and recrystallized with ethyl alcohol to obtain 41.9 g of a white solid product. As a result of infrared spectrum analysis through KBr method, this product was confirmed to be 4-octyloxy benzoic acid having absorptions at 1,675 cm$^{-1}$ and 1,600 cm$^{-1}$.

Synthesis of 4-(2-methyloctanoyl) phenyl, 4-octyloxy benzoic acid ester

To 20 ml of methylene chloride were added 425 mg (1.7 mmol) of the above 4-octyloxy benzoic acid, 430 mg (1.7 mmol) of the aforementioned (+)-4-(2-methyloctanoyl) phenol, 350 mg (1.7 mmol) of N,N'-dicyclohexylcarbodiimide and 30 mg of 4-dimethylamino pyridine, which was heated under reflux for 2 hours. After the completion of the reaction, the solid was filtered off, and the filtrate was concentrated. The residue was isolated and purified by a column chromatography of silica gel to obtain 470 mg of a white solid product.

As a result of the analysis, the thus obtained compound was confirmed to be 4-(2-methyloctanoyl) phenyl, 4-octyloxy benzoic acid ester having the aforementioned physical and chemical properties.

Evaluation of liquid crystal properties

As to the liquid crystal properties of the above compound, the change of the texture was observed in the same manner as in Example 12. As a result, it was an isotropic liquid at 41° C. during the heating (+2° C./min), while it was a liquid crystal state of smectic A phase at 24° C., changed into a liquid crystal of chiralsmectic C phase at 15° C. and was finally a solid crystal at 11° C. during the cooling (−10° C./min).

As a result that the spontaneous polarization was measured by the same method as in Example 12, it showed 113 $nC/cm^2$ at 12° C.

Furthermore, the above compound was placed into a monodomain cell of 2 μm in thickness and subjected to a square wave at 40.0 Vpp and 100 Hz under crossnicol, during which the time change of light transmittance was detected by a photodiode to measure a response time. When the light transmittance was 100% at maximum and 0% at minimum, a time requiring the amount of 10% to 90% was represented by the response time. As a result, it was 37.6 μsec at 12° C. and was fairly fast.

EXAMPLE 27

Synthesis of 4-(2-methyloctanol) phenyl, 4-tetradecyloxy benzoic acid ester

In the synthesis of 4-octyloxy benzoic acid of Example 26, the same procedure was repeated except that bromotetradecane was used instead of bromooctane to obtain 4-tetradecyloxy benzoic acid. This 4-tetradecyloxy benzoic acid was condensed with (+)-4-(2-methyloctanoyl) phenol in the same manner as in the synthesis of 4-(2-methyloctanoyl) phenyl, 4-octyloxy benzoic acid ester of Example 26 to synthesize 4-(2-methyloctanoyl) phenyl, 4-tetradecyloxy benzoic acid ester having the aforementioned physical and chemical properties.

The phase transition, spontaneous polarization and response time were measured with respect to this compound in the same manner as in Example 26.

As to the phase transition, it changed from the crystal to isotropic liquid at 45.8° C. during the heating (+2° C./min), while it was a liquid crystal state of chiralsmectic C phase at 25.0° C. and changed into a solid crystal at 21.8° C.

Furthermore, the spontaneous polarization and response time at 22.5° C. were 76.9 $nC/cm^2$ and 21.7 μsec, respectively.

EXAMPLE 28

Synthesis of 4-(2-methyloctanoyl) phenyl, 4-octyl benzoic acid ester 4-octyl benzoic acid and 4-(2-methyloctanoyl) phenol were condensed in the same manner as in the synthesis of 4-(2-methyloctanoyl) phenyl, 4-octyloxy benzoic acid ester of Example 26 to synthesize 4-(2-methyloctanoyl) phenyl, 4-octyl benzoic acid ester having the aforementioned physical and chemical properties.

EXAMPLE 29

Synthesis of 4-decanoyloxy benzoic acid 5.0 g (40 mmol) of 4-hydroxy benzoic acid was dissolved in 40 me of pyridine, to which was added dropwise 710 g (40 mmol) of decanoic acid chloride. The mixed solution was reacted with stirring at room temperature for 5 hours, cooled in ice and rendered into pH of not more than 2 with an aqueous solution of 6 normal hydrochloric acid. The precipitated solid was filtered and recrystallized with ethyl alcohol to obtain 8.6 g (yield 94%) of a white solid of 4-decanoyloxy benzoic acid having infrared absorption spectra at 1,760 $cm^{-1}$ and 1,680 $cm^{-1}$.

Synthesis of 4-decanoyloxy benzoic acid-4-(2-methyloctanoyl) phenyl 530 mg (1.8 mmol) of the above 4-decanoyloxy benzoic acid, 400 mg (1.9 mmol) of dicyclohexyl-carbodiimide and 76 mg of dimethylamino pyridine were dissolved in 10 ml of methylene chloride. To this solution was added dropwise a solution of 420 mg (1.8 mmol) of 2-methyloctanoyl phenol dissolved in 5 ml of methylene chloride, which was reacted under reflux for 4 hours with stirring. After the completion of the reaction, the filtration was carried out and the filtrate was condensed and isolated by a column chromatography of silica gel. After the solvent was removed from the liquid, the residue was recrystallized with ethyl alcohol to obtain 814 mg (yield 89%) of a white solid of 4-decanoyloxy benzoic acid-4-(2-methyloctanoyl) phenyl having the aforementioned physical and chemical properties.

Evaluation of liquid crystal properties

The liquid crystal properties of the above compound were observed in the same manner as in Example 12. As a result, it was a liquid crystal state of smectic A phase at 30.0° C. and was finally an isotropic liquid at 41.1° C. during the heating, while it was a liquid crystal state of smectic A phase at 38.5° C., changed into a liquid crystal of chiralsmectic C phase at 28.8° C. and was finally a solid crystal at 27.9° C. during the cooling. In this compound, the presence of a liquid crystal of other ferroelectric phase was not recognized at low temperature side of the chiralsmectic C phase.

As a result that the spontaneous polarization was measured by the same method as in Example 12, it showed 46 $nC/cm^2$ at 26.8° C.

EXAMPLE 30

Synthesis of 4-dodecyloxycarbonyloxy benzoic acid 2.5 g (18 mmol) of 4-hydroxy benzoic acid was dissolved in 30 ml of pyridine, to which was added dropwise 4.5 g (18 mmol) of chloroformic acid-n-dodecyl for 10 minutes. The mixed solution was reacted at room temperature for 4 hours with stirring, cooled in ice and rendered into pH of not more than 2 with an aqueous solution of 6 normal hydrochloric acid. The precipitated solid was filtered and recrystallized with acetone to obtain 2.5 g (yield 40%) of a white solid of 4-dodecyloxycarbonyloxy benzoic acid having infrared absorption spectra at 1,760 $cm^{-1}$ and 1,680 $cm^{-1}$.

Synthesis of 4-dodecyloxycarbonyloxy benzoic acid-4-(2-methyloctanoyl) phenyl 500 mg (1.4 mmol) of the above 4-dodecyloxycarbonyloxy benzoic acid, 310 mg (1.5 mmol) of dicyclohexylcarbodiimide and 7 mg (0.56 mmol) of dimethylamino pyridine were dissolved in 10 ml of methylene chloride. To this solution was added dropwise a solution of 340 mg (1.4 mmol) of (+)-4-(2-methyloctanoyl) phenol dissolved in 5 ml of methylene chloride, which was reacted under reflux for 18 hours with stirring. After the completion of the reaction, the product was filtered, and the filtrate was condensed and isolated by a column chromatography of silica gel. After the solvent was removed from the liquid, the product was recrystallized with ethyl alcohol to obtain 44 mg of a white solid of 4-dodecyloxycarbonyloxy benzoic acid-4-(2-methyloctanoyl) phenyl having the aforementioned physical and chemical properties.

Evaluation of liquid crystal properties

The liquid crystal properties of this compound were observed in the same manner as in Example 12. As a result, it did not take a liquid crystal state during the heating (+2° C./min), while it was a liquid crystal state of smectic A phase at 27.3° C., changed into a liquid crystal of chiralsmectic C phase at 14.6° C. and was finally a solid crystal at 8.3° C. during the cooling (−10° C./min).

As a result that the spontaneous polarization was measured by the same method as in Example 12, it showed 32 nC/cm$^2$ at 10° C.

EXAMPLE 31

Synthesis of 4-nonanoyloxy benzoic acid-4-(2-methyloctanoyl) phenyl

In the synthesis of 4-decanoyloxy benzoic acid of Example 29, the same procedure was repeated except that nonanoyl chloride was used instead of decanoic acid chloride to synthesize 4-nonanoyloxy benzoic acid. Then, the same procedure as in the synthesis of 4-decanoyloxy benzoic acid-4-(2-methyloctanoyl) phenyl of Example 29 was repeated except that 4-nonanoyloxy benzoic acid was condensed with (+)-4-(2-methyloctanoyl) phenol instead of 4-decanoyloxy benzoic acid to obtain 4-nonanoyloxy benzoic acid-4-(2-methyloctanoyl) phenyl having the aforementioned physical and chemical properties.

Evaluation of liquid crystal properties

The liquid crystal properties of this compound were observed in the same manner as in Example 12. As a result, it was a liquid crystal state of smectic A phase at 30.3° C. and an isotropic liquid at 22.0° C. during the heating (+2° C./min), while it was a liquid crystal state of smectic A phase at 29.0° C. during the cooling (+2° C./min). Further, in the cooling (−10° C./min), it was a liquid crystal state of smectic A phase at 30.1° C. and changed into a liquid crystal of chiralsmectic C phase at 19.0° C.

EXAMPLE 32

Synthesis of 4-octyloxycarbonyl benzoic acid 2.5 g (12 mmol) of terephthalic acid dichloride and 1.2 g (9.2 mmol) of octyl alcohol were dissolved in 100 ml of pyridine and reacted at room temperature for 2 hours with stirring. After the completion of the reaction, solid was precipitated by adding an aqueous solution of 6 normal hydrochloric acid and separated by filtration. This precipitate was recrystallized with ethanol and washed with toluene to obtain 320 mg (yield 10%) of a white solid of 4-octyloxycarbonyl benzoic acid having infrared absorption spectra at 2,800 cm$^{-1}$, 2,700 cm$^{-1}$, 2,500~2,700 cm$^{-1}$, 1,270 cm$^{-1}$, 1,680~1,700 cm$^{-1}$ and 1,580 cm$^{-1}$.

Synthesis of 4-(2-methyloctanoyl)phenyl, 4-octyloxycarbonyl benzoic acid ester

To 10 ml of methylene chloride were added 170 mg (0.72 mmol) of (+)-4-(2-methyloctanoyl) phenol, 200 mg (0.72 mmol) of the above 4-octyloxycarbonyl benzoic acid and 7 mg of 4-dimethylamino pyridine, and 165 mg (0.8 mmol) of N,N'-dicyclohexylcarbodiimide was added thereto. The mixture was reacted by heating under reflux for 4 hours, and the precipitated solid was filtered. The filtrate was concentrated, isolated by a column chromatography of silica gel and recrystallized with ethyl alcohol to obtain 67 mg (yield 19%) of white 4-(2-methyloctanoyl)phenyl-4-octyloxycarbonyl benzoic acid ester having the aforementioned physical and chemical properties.

Evaluation of liquid crystal properties

The above compound was mixed with a commercially available 2-(4'-(2''-methylbutyloxy)phenyl)-5-undecyloxy pyrimidine at a mixing ratio of 12 wt% to 88 wt%, and then the change of liquid crystal texture was observed in the same manner as in Example 12. As a result, the mixture was smectic A phase at 66.2° C., changed into a liquid crystal of chiralsmectic C phase at 55.0° C. and was finally a solid crystal at 45.7° C. during the cooling at 2° C./min.

Furthermore, the spontaneous polarization at 50° C. was measured to be 18 nC/cm$^2$. And also, the response time was measured by applying a square wave in electric field of 2 Vpp/μm to obtain 154 μsec.

Moreover, 2-(4'-(2''-methylbutyloxy)phenyl)-5-undecyloxy pyrimidine alone was smectic A phase at 5.4° C., changed into a liquid crystal of chiralsmectic C phase at 70.5° C., and was finally a solid crystal at 5.5° C. The spontaneous polarization at 50° C. was 4 nC/cm$^2$ and the response time in the application of square wave at electric field of 2 Vpp/μm was 242 μsec. From these facts, it is obvious that by mixing with the compound according to the invention, the liquid crystal region of chiralsmectic C phase is shifted toward low temperature side, and the spontaneous polarization is made large and the response rate is made fast.

EXAMPLE 33

Synthesis of 4-nonanoyl benzoic acid 188.7 g (1.413 mol) of anhydrous aluminum chloride was added to 566 ml of 1,2-dichloroethane, to which was added dropwise 161.5 g (1.682 mol) of benzene fluoride while maintaining at a temperature of 3°~5° C. To this mixture was added 254.5 g (1.442 mol) of nonanoyl chloride over 2 hours, which was reacted at 8° C. for 1 hour and at 8°~30° C. for 5 hours. This reaction solution was poured into 600 ml of concentrated hydrochloric acid containing 200 g of ice and extracted with 1.5 l of chloroform. The extract was washed with water and an aqueous 5% sodium carbonate solution and dried on magnesium sulfate. After the solvent was distilled off, the reaction liquid was distilled under a reduced pressure (145°~150° C./5 mmHg) to obtain 292.2 g (yield 86%) of 4-nonanoyl-benzene fluoride.

To 1,350 ml of dimethylsulfoxide were added 292.2 g (1.238 mol) of 4-nonanyol-benzene fluoride and 67.4 g (1.374 mol) of sodium cyanide, which was reacted at 110°~125° C. for 12 hours. After the cooling up to room temperature, the reaction liquid was poured into 2.7 l of water and extracted with 2 l of chloroform. The extract was washed with a saturated aqueous solution of sodium chloride and dried on anhydrous magnesium sulfate. The solvent was distilled off from the liquid to obtain 317.9 g of a brown oily compound of 4-nonanoyl benzonitrile having infrared absorption spectra at 2,220 cm$^{-1}$ and 1,680 cm$^{-1}$.

Then, 314.1 g of the above 4-nonanoyl benzonitrile was added to 314 ml of ethyl alcohol and warmed to 80°~82° C., and 1,500 ml of 30% potassium hydroxide was added dropwise thereto, which was reacted under reflux for 5 hours. To this reaction liquid was added 1.5 l of water, and the precipitated solid was recovered by filtration, washed with methyl alcohol and dried in air to obtain 283.1 g of a light brown crystal. This crystal was poured into 1.5 l of water added with 200 ml of concentrated hydrochloric acid, heated at 65°~82° C. for 1 hour with stirring, and filtered. Then, the resulting solid was poured into 200 ml of concentrated hydrochloric acid, dissolved in 1,100 ml of acetic acid, warmed, dissolved, cooled to 30° C., filtered, washed with acetic acid, water and methyl alcohol in this order and dried in air to obtain 170 g (yield 50%) of 4-nonanoyl benzoic acid having the following properties:

1  $^1$H-NMR (in $CDl_3$-$CF_3CO_2$ D, TMS standard, δppm): 11.4(s, 1H), 8.2~8.0(ABq, 4H), 3.1(t, 2H), 2.1~1.1(m, 12H), 0.9(t, 3H)

2  IR ($cm^{-1}$): 1680

Synthesis of 4-(2-methyloctanoyl) phenyl, 4-nonanoyl benzoic acid ester

To 15 ml of methylene chloride were added 336 mg (1.3 mmol) of the above 4-nonanoyl benzoic acid, 300 mg (1.3 mmol) of (+)-4-(2-methyloctanoyl) phenol and 7 mg of 4-dimethylamino pyridine, to which was added 290 mg (1.4 mmol) of N,N'-dicyclohexylcarbodiimide. This mixture was reacted by heating under reflux for 5 hours, and then the precipitated solid was filtered. The filtrate was concentrated, isolated by a column chromatography of silica gel and recrystallized with ethyl alcohol to obtain 70 mg (yield 15%) of white 4-(2-methyloctanoyl) phenyl, 4'-nonanoyl benzoic acid ester having the aforementioned physical and chemical properties.

Evaluation of liquid crystal properties

The change of liquid crystal texture in this compound was observed in the same manner as in Example 12. As a result, it was a liquid crystal state of chiralsmectic C phase at 63.0° C. and finally a solid crystal at 61.2° C. during the cooling at 2° C./min.

As a result that the spontaneous polarization was measured by the same method as in Example 12, it showed 142 $nC/cm^2$ at 62° C.

EXAMPLE 34

Synthesis of 4-octyloxy benzoic acid-4-(2-methylbutanoyl) biphenyl

Into a flask were charged 92.7 mg (0.36 mmol) of 4-hydroxy-4'-(2-methylbutanoyl) biphenyl, 90.6 mg (0.36 mmol) of 4-octyloxy benzoic acid, 77.1 mg (0.37 mmol) of dicyclohexylcarbodiimide, 7.0 mg (0.05 mmol) of 4-dimethylamino pyridine and 5 ml of dichloromethane, which was heated under reflux for 4 hours with stirring. The resulting solid was filtered off, and the organic layer was washed with 0.1 normal hydrochloric acid and further with water. After the drying on magnesium sulfate and the removal of solvent, the resulting crystal was recrystallized with ethanol to obtain 94.0 mg (yield 53%) of a colorless needle-like crystal of 4-octyloxy benzoic acid-4-(2-methylbutanoyl) biphenyl having the aforementioned physical and chemical properties.

Evaluation of liquid crystal properties

As to the liquid crystal properties of this compound, the change of texture was observed in the same manner as in Example 12. As a result, it was a liquid crystal state of chiralsmectic C phase at 84.0° C., changed into a liquid crystal of smectic A phase at 91.0° C. and was finally an isotropic liquid at 169.8° C. during the heating. During the cooling, it was a liquid crystal state of smectic A phase at 170.5° C., changed into liquid crystals of chiralsmectic C phase at 83.2° C. and other ferroelectric phase at 53.8° C. and was finally a solid crystal at 49.0° C.

As a result that the spontaneous polarization was measured by the same method as in Example 12, it showed 120 $nC/cm^2$ at 55.6° C.

EXAMPLE 35

Synthesis of 4-octyloxy benzoic acid-4-(2-methyloctanoyl) biphenyl

The same procedure as in Example 34 was repeated except that 4-hydroxy-4'-(2-methyloctanoyl) biphenyl was used instead of 4-hydroxy-4'-(2-methylbutanoyl) biphenyl to obtain 4-octyloxy benzoic acid-4-(2-methyloctanoyl) biphenyl having the aforementioned physical and chemical properties.

Evaluation of liquid crystal properties

As to the liquid crystal properties of this compound, the change of texture was observed in the same manner as in Example 12. As a result, it was a liquid crystal state of ferroelectric phase at 57.1° C., changed into liquid crystals of chiralsmectic C phase at 61.2° C. and smectic A phase at 100.4° C. and was finally an isotropic liquid at 139° C. during the heating. During the cooling, it was a liquid crystal state of smectic A phase at 138° C., changed into liquid crystals of chiralsmectic C phase at 106.0° C. and other ferroelectric phase at 47.1° C. and was finally a solid crystal at 32.0° C.

As a result that the spontaneous polarization was measured by the same method as in Example 12, it showed a large spontaneous polarization of 247 $nC/cm^2$ at 51° C.

EXAMPLE 36

Synthesis of 4-decanoyloxy benzoic acid-4-(2-methylbutanoyl) biphenyl

Into a flask were charged 91.8 mg (0.36 mmol) of 4-hydroxy-4'-(2-methylbutanoyl) biphenyl, 117.1 mg (0.40 mmol) of 4-decanoyloxy benzoic acid, 91.5 mg (0.42 mmol) of dicyclohexylcarbodiimide, 4.8 mg (0.04 mmol) of 4-dimethylamino pyridine and 5 ml of dried dichloromethane, which was heated under reflux for 5 hours with stirring. The resulting solid was filtered off, and the filtrate was washed with dichloromethane, 0.1N hydrochloric acid, and then water. After the drying on anhydrous magnesium sulfate and the removal of solvent, the resulting crystal was recrystallized with ethanol to obtain 134.4 mg (yield 70%) of a white crystal of 4-decanoyloxy benzoic acid-4-(2-methylbutanoyl) biphenyl having the aforementioned physical and chemical properties.

Evaluation of liquid crystal properties

As to the liquid crystal properties of this compound, the change of texture was observed in the same manner as in Example 12. As a result, it was a liquid crystal state of ferroelectric phase at 80.0° C., changed into a liquid crystal of smectic A phase at 83.4° C. and was finally an isotropic liquid at 174.2°~176.2° C. during heating. During the cooling, it was a liquid crystal state of smectic A phase at 170.5+ ~173.6° C., changed into a liquid crystal of ferroelectric phase at 74.4° C. and was finally a solid crystal at 71.0° C.

EXAMPLE 37

Synthesis of 4-decanoyloxy benzoic acid-4-(2-methyloctanoyl) biphenyl

The same procedure as in Example 35 was repeated except that 4-hydroxy-4'-(2-methyloctanoyl) biphenyl was used instead of 4-hydroxy-4'-(2-methylbutanoyl) biphenyl to obtain 4 decanoyloxy benzoic acid-4-(2-methyloctanoyl) biphenyl having the aforementioned physical and chemical properties.

Evaluation of liquid crystal properties

As to the liquid crystal properties of this compound, the change of texture was observed in the same manner as in Example 12. As a result, it was a liquid crystal state of chiralsmectic C phase at 74.0° C., changed into a liquid crystal of smectic A phase at 113.8° C. and was finally an isotropic liquid at 150.0° C. during the heating. During the cooling, it was a liquid crystal state of smectic A phase at 147.4° C., changed into a liquid crystal of chiralsmectic C phase at 113.1° C. and was finally a solid crystal at 73.1° C. In this compound, the other ferroelectric phase was not recognized at a low temperature side of chiralsmectic C phase, so that the temperature region of chiralsmectic C phase could easily be changed by mixing with the other liquid crystal additive or the like.

As a result that the spontaneous polarization was measured by the same method as in Example 12, it showed a spontaneous polarization of 182 nC/cm$^2$ at 78.1° C.

EXAMPLE 38

Synthesis of 4-nonanoyloxy benzoic acid-4-(2-methyloctanoyl) biphenyl

. Into a flask were charged 80.7 mg (0.29 mmol) of 4-nonanoyloxy benzoic acid, 84.2 mg (0.27 mmol) of 4-hydroxy-4'-(2-methyloctanoyl) biphenyl, 63.5 mg (0.31 mmol) of dicyclohexylcarbodiimide, 6.0 mg (0.05 mmol) of 4-dimethylamino pyridine and 5 ml of dried dichloromethane, which was heated under reflux for 6 hours. After the cooling, the resulting solid was filtered off, and washed with dichloromethane. The organic phase was washed with 0.1 normal hydrochloric acid and then water, dried on anhydrous magnesium sulfate, and the solvent was distilled off. This product was purified by a column chromatography and recrystallized with ethanol to obtain 65.3 mg (yield 42%) of white 4-nonanoyloxy benzoic acid-4-(2-methyloctanoyl) biphenyl.

Evaluation of liquid crystal properties

As to the liquid crystal properties of this compound, the change of texture was observed in the same manner as in Example 12. As a result, it was a liquid crystal state of chiralsmectic C phase at 74.8° C., changed into a liquid crystal of smectic A phase at 111.3° C. and was finally an isotropic liquid at 138.1°~139.5° C. during the heating. During the cooling, it was a liquid crystal state of smectic A phase at 137.7°~139.5° C., changed into a liquid crystal of chiralsmectic C phase at 111.5° C. and was finally a solid crystal at 71.5° C. In this compound, the other ferroelectric phase was not recognized at a low temperature side of chiralsmectic C phase, so that the temperature region of chiralsmectic C phase could easily be changed by mixing with the other liquid crystal additive or the like.

As a result that the spontaneous polarization was measured by the same method as in Example 12, it showed 242 nC/cm$^2$ (30 Vpp, 100 Hz) at 76.5° C.

EXAMPLE 39

Synthesis of 4-tetradecanoyloxy benzoic acid-4-(2-methyloctanoyl) biphenyl

Into a flask were charged 96.2 mg (0.28 mmol) of 4-tetradecanoyloxy benzoic acid, 78.0 mg (0.25 mmol) of 4-hydroxy-4'-(2-methyloctanoyl) biphenyl, 63.5 mg (0.31 mmol) of dicyclohexylcarbodiimide, 3.5 mg (0.03 mmol) of 4-dimethylamino pyridine and 5 ml of dried dichloromethane, which was heated under reflux for 7 hours. After the cooling, the resulting solid was filtered off and washed with dichloromethane. The organic phase was washed with 0.1 normal hydrochloric acid and further with water, dried on anhydrous magnesium sulfate, and the solvent was distilled off. This product was recrystallized with ethanol to obtain 63.5 mg (yield 40%) of white 4-tetradecanoyloxy benzoic acid-4-(2-methyloctanoyl) biphenyl.

Evaluation of liquid crystal properties

The liquid crystal properties of this compound were observed in the same manner as in Example 12. As a result, it was a liquid crystal state of chiralsmectic C phase at 88.0° C., changed into a liquid crystal of smectic A phase at 116.7° C. and was finally an isotropic liquid at 139.2°~142.2° C. during the heating. During the cooling, it was a liquid crystal state of smectic A phase at 138.0°~141.0° C., changed into a liquid crystal of chiralsmectic C phase at 114.5° C. and was finally a solid crystal at 81.2° C. In this compound, the other ferroelectric phase was not recognized at a low temperature side of chiralsmectic C phase, so that the temperature region of chiralsmectic C phase could easily be changed by mixing with the other liquid crystal additive or the like.

As a result that the spontaneous polarization was measured by the same method as in Example 12, it showed 178 nC/cm$^2$ (30 Vpp, 100 Hz) at 84.5° C.

EXAMPLE 40

Synthesis of 4-(2-methyloctanoyl) biphenyl, 4-octyloxycarbonyl benzoic acid ester To 10 ml of methylene chloride were added 85 mg (0.31 mmol) of 4-octyloxycarbonyl benzoic acid obtained in Example 32, 95 mg (0.31 mmol) of 4-hydroxy-4'-(2-methyloctanoyl) biphenyl and 20 mg of 4-dimethylamino pyridine, which was added with 70 mg (0.32 mmol) of N,N'-dicyclohexylcarbodiimide. This mixture was reacted by heating under reflux for 4 hours, and the precipitated solid was filtered off. The filtrate was concentrated and isolated by a column chromatography of silica gel to obtain 42 mg (yield 24%) of white (+)-4-(2-methyloctanoyl) biphenyl, 4-octyloxycarbonyl benzoic acid ester having the aforementioned physical and chemical properties.

Evaluation of liquid crystal properties

As to the liquid crystal properties of this compounds, the change of the texture was observed in the same manner as in Example 12. As a result, it was a liquid crystal state of chiralsmectic C phase at 67.0° C., changed into liquid crystals of smectic A phase at 96.3° C. and chiralsmectic C phase at 115.6° C. and was finally an isotropic liquid at 45.7° C. during the heating at 2° C./min. During the cooling, it was a liquid crystal state of smectic A phase at 115.6° C., changed into a liquid crystal of chiralsmectic C phase at 96.3° C. and was finally a solid crystal at 57.3° C.

As a result that the spontaneous polarization was measured by the same method as in Example 12, it showed a large spontaneous polarization of 237 nC/cm$^2$ at 61.5° C.

EXAMPLE 41

Synthesis of 4-(2-methyloctanoyl) biphenyl, 4-nonanoyl benzoic acid ester

To 10 ml of methylene chloride were added 85 mg (0.32 mmol) of 4-nonanoyl benzoic acid obtained in Example 33, 100 mg (0.32 mmol) of (+)-4-hydroxy-4'-(2-methyloctanoyl) biphenyl and 6 mg of 4-dimethylamino pyridine, which was added with 73 mg (0.35 mmol) of N,N'-dicyclohexylcarbodiimide. This mixture was reacted by heating under reflux for 4 hours, and the precipitated solid was filtered off. The filtrate was condensed, isolated by a column chromatography of silica gel and recrystallized with ethyl alcohol to obtain 31 mg (yield 18%) of white 4-(2-methyloctanoyl) biphenyl, 4-nonanoyl benzoic acid ester having the aforementioned physical and chemical properties.

Evaluation of liquid crystal properties

As to the liquid crystal properties of this compound, the change of the liquid crystal texture was observed in the same manner as in Example 12. As a result, it was a liquid crystal state of chiralsmectic C phase at 154.5° C., and was a solid crystal at 110.4° C. during the cooling at 2° C./min.

As a result that the spontaneous polarization was measured by the same method as in Example 12, it showed a large spontaneous polarization of 209 nC/cm$^2$ at 11.5° C.

EXAMPLE 42

Synthesis of 4-octyl benzoic acid-4-(2-methyloctanoyl) biphenyl

Into a flask were charged 147.2 mg (0.63 mmol) of a commercially available 4-octyl benzoic acid, 160.1 mg (0.52 mmol) of 4-hydroxy-4'-(2-methyloctanoyl) biphenyl, 150.4 mg (0.73 mmol) of dicyclohexylcarbodiimide, 8.5 mg (0.07 mmol) of 4-dimethylamino pyridine and 6 ml of dried dichloromethane, which was reacted in a room for 1 hour with stirring.

After the resulting solid was filtered off and the solvent was distilled off, the resulting rough crystal was purified by a column chromatography of silica gel and recrystallized with ethanol to obtain 101.6 mg (yield 37%) of a white crystal of 4-octyl benzoic acid-4-(2-methyloctanoyl) biphenyl.

Evaluation of liquid crystal properties

The liquid crystal properties of this compound were observed in the same manner as in Example 12. As a result, it was a liquid crystal state of chiralsmectic C phase at 64.2° C. during the heating. During the cooling, it was a liquid crystal state of smectic A phase at 109.8°~113.3° C., changed into a liquid crystal of chiralsmectic C phase at 74.0° C. and was finally a solid crystal at 43.3° C.

As a result that the spontaneous polarization was measured in the same manner as in Example 12, it showed a large value of 236 nC/cm$^2$ at 44° C.

EXAMPLE 43

Synthesis of 4-(2-methyloctanoyl)benzoic acid

Into a flask were charged 6.15 g (32.9 mmol) of 4-bromobenzyl alcohol, 50 ml of dried dichloromethane, 4 ml (41.8 mmol) of ethyl vinyl ether and 0.20 g (0.8 mmol) of pyridinium-p-toluene sulfonate, which was reacted at room temperature for 20 hours with stirring. This reaction product was washed with water, dried on anhydrous magnesium sulfate, and the solvent was distilled off to obtain 8.51 g of an oily 4-bromobenzyl-(1-ethoxy) ethyl ether.

Then, 323 mg (13.3 mmol) of metal magnesium was fed into a flask and dissolved in 10 ml of dried tetrahydrofuran with warming at 50° C.

To this solution was added dropwise 2.61 g (10.1 mmol) of the above 4-bromobenzyl-(1-ethoxy) ethyl ether over 40 minutes. After the completion of the addition, the mixture was heated under reflux for 1 hour and cooled to −78° C., to which was added dropwise 1.70 g (9.6 mmol) of (+)-2-methyl octanoic acid chloride dissolved in 20 ml of tetrahydrofuran over 40 minutes. The mixture was stirred at −78° C. for 3 hours and gradually turned to room temperature. It was added with 10 ml of a normal hydrochloric acid cooled at 0° C. and stirred for 1 hour. The product was extracted with ether and washed with a saturated aqueous solution of sodium hydrogen carbonate and further a saturated aqueous solution of sodium chloride. It was dried on anhydrous magnesium sulfate, and the oily matter after the removal of solvent was purified by a column chromatography of silica gel to obtain 323 mg (yield 14%) of a colorless and oily 4-(2-methyloctanoyl) benzyl alcohol.

Into a flask were charged 32.30 g (1.3 mmol) of 4-(2-methyloctanoyl) benzyl alcohol, 20 ml of acetone and 0.30 g (1.9 mmol) of potassium permanganate, which was stirred at room temperature for 3 hours. To this mixture were added an aqueous solution of sodium hydrogen sulfite and 1 normal hydrochloric acid to reduce manganese to bivalent, and acetone was distilled off under a reduced pressure, and the product was extracted with chloroform and washed with water.

The extract was dried on anhydrous magnesium sulfate, and the oily matter after the removal of solvent was purified by a column chromatography of silica gel to obtain 327.2 mg (yield 92%) of a colorless and oily 4-(2-methyloctanoyl) benzoic acid.

Synthesis of 4-(2-methyloctanoyl) benzoic acid-4-octyloxy biphenyl

Into a flask were charged 5.02 g (27.0 mmol) of p,p'-biphenol, 5.23 g (27.2 mmol) of octyl bromide, 3.73 g (27.0 mmol) of potassium carbonate and 150 ml of acetone, which was heated under reflux for 5.5 hours. After acetone was distilled off under a reduced pressure, 2 normal hydrochloric acid and 50 ml of chloroform were added. The resulting solid was filtered off, and the filtrate was separated into an organic layer and an aqueous layer, and the aqueous layer was extracted with chloroform two times. The extract was combined with the organic layer and dried on anhydrous magnesium sulfate, and then the solvent was distilled off to obtain a solid. This solid was added with 50 ml of toluene, and the remaining solid after the stirring was gathered and recrystallized with chloroform to obtain 1.26 g (yield 16%) of a white crystal of 4-hydroxy-4'-octyloxy biphenyl.

Into a flask were charged 83.0 mg (0.31 mmol) of 4-hydroxy-4'-octyloxy biphenyl, 70.9 mg (0.27 mmol) of 4-(2-methyloctanoyl) benzoic acid, 73.5 mg (0.36 mmol) of N,N'-dicyclohexylcarbodiimide, 6.1 mg (0.05 mmol) of 4-dimethylamino pyridine and 4 ml of dried dichloromethane, which was reacted at room temperature for 1.5 hours with stirring. The resulting solid was filtered off and the solvent was distilled off, and then the resulting rough crystal was purified by a column chromatography of silica gel and recrystallized with ethanol to obtain 84.5 mg (yield 58%) of a white crystal of 4-(2-methyloctanoyl) benzoic acid-4-octyloxy biphenyl.

Evaluation of liquid crystal properties

The liquid crystal properties of this compound were observed in the same manner as in Example 12. As a result, it was a liquid crystal state of other highly smectic phase below room temperature, changed into smectic A phase at 101.0°~102.8° C. and was finally an isotropic liquid at 139.8°~141.3° C. during the heating. Further, during the cooling, it was a liquid crystal state of smectic A phase at 140.5°~141.3° C., changed into a highly other ferroelectric liquid crystal at 100.4°~102.1° C. and was a solid crystal below room temperature.

EXAMPLE 44

Synthesis of 4-(2-methyloctanoyl) benzoic acid-4-nonanoyloxy biphenyl

Into a flask were charged 151.0 mg (0.58 mmol) of 4-(2-methyloctanoyl) benzoic acid, 321.3 mg (1.74 mmol) of p,p'-biphenol, N,N'-dicyclohexyl-carbodiimide (0.66 mmol) and 6 ml of dried pyridine, which was stirred at room temperature for 6 hours. The resulting solid was filtered off and the solvent was distilled off, and the resulting oily matter was purified by a column chromatography of silica gel to obtain 122.3 mg (yield 49%) of 4-(2-methyloctanoyl) benzoic acid-4-hydroxy biphenyl.

Into a flask were charged 62.3 mg (0.14 mmol) of the above 4-(2-methyloctanoyl) benzoic acid-4-hydroxy biphenyl, 0.2 ml (11.1 mmol) of nonanic acid chloride and 5 ml of dried pyridine, which was reacted with stirring at room temperature for 2 days. After the completion of the reaction, the reaction product was added with a saturated aqueous solution of sodium hydrogen carbonate and extracted with ether. The extract was dried on anhydrous magnesium sulfate, and the oily matter after the removal of the solvent was purified by a column chromatography of silica gel to obtain 43.3 mg (yield 52%) of a white crystal of 4-(2-methyloctanoyl) benzoic acid-4-nonanoyloxy biphenyl.

Evaluation of liquid crystal properties

The liquid crystal properties of this compound were observed in the same manner as in Example 12. As a result, it was a liquid crystal state of highly ferroelectric phase at 75.0° C., changed into a phase showing no highly ferroelectricity at 83.0° C. and further liquid crystals of chiralsmectic C phase at 91.6° C. and smectic A phase at 119.4° C. and was finally an isotropic liquid at 136.4°~141.2° C. during the heating. During the cooling, it was a liquid crystal state of smectic A phase at 136.0°~139.6° C., changed into a liquid crystal of chiralsmectic C phase at 119.3° C., a phase showing no highly ferroelectricity at 90.8° C. and a liquid crystal of a phase showing a highly ferroelectricity at 72.9° C. and was finally a solid crystal at 49.9° C.

As a result that the spontaneous polarization was measured in the same manner as in Example 12, it showed 117 nC/cm$^2$ at 94.3° C.

EXAMPLE 45

Synthesis of 4-(2-methyloctanoyl) benzoic acid-4-octyloxy phenyl

Into a flask were charged 132.0 mg (0.59 mmol) of 4-octyloxy phenol, 130.0 mg (0.50 mmol) of 4-(2-methyloctanoyl) benzoic acid, 131.0 mg (0.64 mmol) of N,N'-dicyclohexylcarbodiimide, 6.0 mg (0.05 mmol) of 4-dimethylamino pyridine and 8 ml of dried dichloromethane, which was reacted at room temperature for 1 hour with stirring. The resulting solid was filtered off and the solvent was distilled off, and the resulting rough crystal was purified by a column chromatography of silica gel and recrystallized with ethanol to obtain 101.2 mg (yield 45%) of a white crystal of 4-(2-methyloctanoyl) benzoic acid-4-octyloxy phenyl.

Evaluation of liquid crystal properties

The liquid crystal properties of this compound were observed in the same manner as in Example 12. As a result, it was an isotropic liquid at 55° C. during the heating, and a solid crystal at 39.0° C. during the cooling.

EXAMPLE 46

Synthesis of 4-(2-methyloctanoyl) benzoic acid-4-hexyloxy phenyl

Into a flask were charged 158.6 mg (0.82 mmol) of 4-hexyloxy phenol, 210.0 mg (0.80 mmol) of 4-(2-methyloctanoyl) benzoic acid, 201.3 mg (0.98 mmol) of N,N'-dicyclohexylcarbodiimide, 13.8 mg (0.11 mmol) of 4-dimethylamino pyridine and 10 ml of dried dichloromethane, which was reacted at room temperature for 1 hour with stirring. The resulting solid was filtered off and the solvent was distilled off, and the resulting rough crystal was purified by a column chromatography of silica gel and recrystallized with ethanol to obtain 69.0 mg (yield 20%) of a white crystal of 4-(2-methyloctanoyl) benzoic acid-4-hexyloxy phenyl.

Evaluation of liquid crystal properties

The liquid crystal properties of this compound were observed in the same manner as in Example 12. As a result, it was an isotropic liquid at 57.3°~59.1° C. during the heating, and a solid crystal at 54.0°~55.3° C. during the cooling.

EXAMPLE 47

Synthesis of 4'-(2-methyloctanoyl)-4-hydroxymethyl biphenyl 6.50 g (48.7 mmol) of anhydrous aluminum chloride, 3.5 ml (49.2 mmol) of acetyl chloride and 20 ml of dried dichloromethane were placed in a flask and reacted at 0° C. for 10 minutes with stirring. The mixture was added with 10.02 g (43.0 mmol) of 4-bromo biphenyl dissolved in 30 ml of dried dichloromethane, and reacted at 0° C. for 30 minutes and at room temperature for 2 hours with stirring. The reaction product was cooled to 0° C., added with 1 normal hydrochloric acid and extracted with dichloromethane. The extract was washed with a saturated aqueous solution of sodium hydrogen carbonate, dried on anhydrous magnesium sulfate, and the solvent was distilled off to obtain 11.82 g of a white crystal of 4-acetyl-4'-bromo biphenyl.

Into a flask were charged 14.96 g (374 mmol) of sodium hydroxide and 100 ml of water, which was cooled to 0° C. and added dropwise with 6.7 ml (130 mmol) of bromine for 30 minutes. This mixture was added with 11.66 g (42.4 mmol) of 4-acetyl-4'-bromo biphenyl and 50 ml of dioxane and reacted at room temperature for 18 days with stirring.

The resulting crystal was filtered off by adding 1 normal hydrochloric acid to thereby obtain 10.58 g (yield 90%) of 4'-bromo biphenyl-4-carboxylic acid.

3.108 g (11.2 mmol) of the above 4'-bromo biphenyl-carboxylic acid and 30 ml of dried tetrahydrofuran were charged into a flask and cooled to 0° C., to which was slowly added 0.64 g (16.9 mmol) of lithium aluminum hydroxide and stirred for 1 hour. The mixture was added with 1 normal hydrochloric acid and extracted with chloroform, and then the extract was washed with a saturated aqueous solution of sodium hydrogen carbonate. It was dried on anhydrous magnesium sulfate, and the solvent was distilled off, and then the resulting rough crystal was recrystallized with hexane-ether to obtain 2.20 g (yield 75%) of a white crystal of 4'-bromo-4-hydroxymethyl biphenyl.

Into a flask were charged 2.12 g (8.1 mmol) of 4'-bromo-4-hydroxymethyl biphenyl, 20 ml of dried dichloromethane, 3 ml (31.3 mmol) of ethylvinyl ether and 0.20 g (0.8 mmol) of pyridinium-p-toluene sulfonate, which was reacted at room temperature for 15 hours with stirring. After the completion of the reaction, the product was washed with water, dried on anhydrous magnesium sulfate, and then the solvent was distilled off to obtain 2.70 g of 4-(4-bromophenyl) benzyl-(1-ethoxy) ethyl ether.

220 mg (9.0 mmol) of metal magnesium was placed in a flask and added dropwise with 2.70 g (8.1 mmol) of the above 4-(4-bromophenyl) benzyl-(1-ethoxy) ethyl ether dissolved in 10 ml of dried tetrahydrofuran over 30 minutes while being warmed to 50° C. After the heating under reflux for 1 hour, it was cooled to −78° C. and added dropwise with 1.42 g (8.0 mmol) of (+)-2-methyloctanoic acid chloride dissolved in 20 ml of dried tetrahydrofuran over 20 minutes. Then, the resulting mixture was stirred at −78° C. for 3 hours and then gradually turned to room temperature.

The resulting product was added with 10 ml of 1 normal hydrochloric acid, stirred for 1 hour, extracted with ether, and then the extract was washed with a saturated aqueous solution of sodium hydrogen carbonate and a saturated aqueous solution of sodium chloride. It was dried on anhydrous magnesium sulfate and the solvent was distilled off, and then the resulting oily matter was purified by a column chromatography of silica gel to obtain 293.1 mg (yield 11%) of colorless and oily 4'-(2-methyloctanoyl)-4-hydroxymethyl biphenyl.

Synthesis of 4'-(2-methyloctanoyl) biphenyl-4-carboxylic acid-4-octyloxy phenyl 131.1 mg (0.40 mmol) of 4'-(2-methyloctanoyl)-4-hydroxymethyl biphenyl, 15 ml of acetone and 0.15 g (0.95 mmol) of potassium permanganate were charged into a flask and stirred at room temperature for 2 hours.

An aqueous solution of sodium hydrogen sulfite and 1 normal hydrochloric acid were added to reduce manganese to bivalent, and then acetone was distilled off under a reduced pressure and the extraction with chloroform was performed. The extract was washed with water to obtain 125.0 mg (yield 92%) of a white crystal of 4'-(2-methyloctanoyl) biphenyl-4-carboxylic acid.

Into a flask were charged 100.0 mg (0.30 mmol) of 4'-(2-methyloctanoyl) biphenyl-4-carboxylic acid 67.0 mg (0.30 mmol) of 4-octyloxy phenol, 69.3 mg (0.34 mmol) of N,N'-dicyclohexylcarbodiimide, 5.0 mg (0.04 mmol) of 4-dimethylamino pyridine and 6 ml of dried dichloromethane, which was stirred at room temperature for 13 hours. The resulting solid was filtered off and the solvent was distilled off, and the resulting rough crystal was purified by a column chromatography of silica gel and recrystallized with ethanol to obtain 69.8 mg (yield 44%) of a white crystal of 4'-(2-methyloctanoyl) biphenyl-4-carboxylic acid-4-octyloxy phenyl.

Evaluation of liquid crystal properties

The liquid crystal properties of this compound were observed in the same manner as in Example 12. As a result, it was a liquid crystal state of chiralsmectic C phase at 60.7° C. during the heating while during the cooling, it was a liquid crystal state of smectic A phase at 138.5°~140.7° C., changed into a liquid crystal of chiralsmectic C phase at 108.1° C. and was finally a solid crystal at 53.1° C.

As a result that the spontaneous polarization was measured in the same manner as in Example 12, it value of 277 nC/cm$^2$ at 53.1° C.

EXAMPLE 48

Synthesis of 4'-(2-methyloctanoyl) biphenyl 4-carboxylic acid-4-heptylphenyl

Into a flask were charged 119.3 mg (0.35 mmol) of 4'-(2-methyloctanoyl) biphenyl-4-carboxylic acid, 74.5 mg (0.39 mmol) of 4-heptyl phenol, 87.3 mg (0.42 mmol) of N,N'-dicyclohexylcarbodiimide, 4.3 mg (0.04 mmol) of 4-dimethylamino pyridine and 6 ml of dried dicyclomethane, which was heated under reflux at room temperature for 1.5 hours. The resulting solid was filtered off, and the filtrate was concentrated to obtain an oily matter, which was purified by a column chromatography of silica gel and recrystallized with ethanol to obtain 57.3 mg (yield 32%) of a white crystal of 4'-(2-methyloctanoyl) biphenyl-4-carboxylic acid-4-heptylphenyl.

Evaluation of liquid crystal properties

The liquid crystal properties of this compound were observed in the same manner as in Example 12. As a result, it was a liquid crystal state of cholesteric phase at 89.9°~90.9° C. and an isotropic liquid at 98.5°~98.7° C. during the heating, while during the cooling, it was a liquid crystal state of cholesteric phase at 98.2°~98.3° C. and was finally a solid crystal at 84.6° C.

EXAMPLE 49

Evaluation of liquid crystal properties in a mixture system 4-(2-methyloctanoyl) phenyl, 4 octyloxybenzoic acid ester obtained in Example 26 was mixed with 4-(2-methyloctanoyl) phenyl, 4-tetradecyloxy benzoic acid ester obtained in Example 27 at an equimol ratio, and then the phase transition, spontaneous polarization and response time were measured in the same manner as in Example 26.

As a result, the mixture was a liquid crystal state of ferroelectric phase at 18.5° C. and an isotropic liquid at 35.1° C. during the heating (+2° C./min). During the cooling (−2° C./min), it was a liquid crystal state of smectic A phase at 29.8° C., changed into a liquid crystal of chiralsmectic C phase at 23° C. and was finally a solid crystal at −1.5° C. Furthermore, the spontaneous polarization was 102.7 nC/cm$^2$ at 16° C. and the response time was 27.3 μsec at the same temperature.

EXAMPLE 50

Evaluation of liquid crystal properties in a mixture system

Synthesis of 4-(2-methyloctanoyl) phenyl, 4-hexyloxy benzoic acid ester

The same procedure as in the synthesis of 4-octyloxy benzoic acid of Example 26 was repeated except that bromohexane was used instead of bromooctane to obtain 4-hexyloxy benzoic acid. This 4-hexyloxy benzoic acid was condensed with (+)-4-(2-methyloctanoyl) phenol in the same manner as in the synthesis of 4-(2-methyloctanoyl) phenyl, 4-octyloxy benzoic acid ester of Example 26 to synthesize 4-(2-methyloctanoyl) phenyl, 4-hexyloxy benzoic acid ester having the aforementioned physical and chemical properties.

4-(2-methyloctanoyl) phenyl, 4-octyloxy benzoic acid ester obtained in Example 26 was mixed with 4-(2-methyloctanoyl) phenyl, 4-tetradecyloxy benzoic acid ester obtained in Example 27 and the above 4-(2-methyloctanoyl) phenyl, 4-hexyloxy benzoic acid at an equimol ratio, and then the phase transition, spontaneous polarization and response time were measured in the same manner as in Example 26.

As a result, the mixture was a liquid crystal state of ferroelectric phase at 14° C. and an isotropic liquid at 30° C. during the heating (+2° C./min). During the cooling (−2° C./min), it was a liquid crystal state of smectic A phase at 27.4° C., changed into a liquid crystal of chiralsmectic C phase at 11.5° C. and was finally a solid crystal at −9.0° C. Furthermore, the spontaneous polarization was 155 nC/cm$^2$ at 2.5° C. and the response time was 20 μsec at the same temperature.

EXAMPLE 51

Evaluation of liquid crystal properties in a mixture system 4-decanoyloxy benzoic acid-4-(2-methyloctanoyl) phenyl obtained in Example 29 was mixed with 4-(2-methyloctanoyl) phenyl, 4'-octyloxy biphenyl-4-carboxylic acid ester obtained in Example 15 at an equimol ratio, and then the liquid crystal properties were evaluated in the same manner as in Example 12.

As a result, the mixture was liquid crystal states of highly other smectic phase at −3.7° C. and chiralsmectic C phase at 25.5° C. during the heating, while during the cooling, it was a liquid crystal state of smectic A phase at 102.0° C., changed into liquid crystals of chiralsmectic C phase at 70.0° C. and highly other smectic phase at 23.2° C. and was finally a solid crystal at −15.0° C.

Further, as a result that the spontaneous polarization was measured in the same manner as in Example 12, it showed 239 nC/cm$^2$ at 25.0° C.

EXAMPLE 52

Evaluation of liquid crystal properties in a mixture system 4-decanoyloxy benzoic acid-4-(2-methyloctanoyl) biphenyl obtained in Example 37 was mixed with 4-decanoyloxy benzoic acid-4-(2-methyloctanoyl) phenyl obtained in Example 29 at an equimol ratio, and then the liquid crystal properties were evaluated in the same manner as in Example 12.

As a result, the mixture was a liquid crystal state of chiralsmectic C phase at 22.1° C., changed into a liquid crystal of smectic A phase at 57.0° C. and was finally an isotropic liquid at 100.4° C. during the heating. Furthermore, during the cooling, it was a liquid crystal state of smectic A phase at 97.1° C., changed into a liquid crystal of chiralsmectic C phase at 58.0° C. and was finally a solid crystal at 10.0° C.

Moreover, as a result that the spontaneous polarization was measured in the same manner as in Example 12, it showed 125 nC/cm$^2$ at 44.0° C.

EXAMPLE 53

Evaluation of liquid crystal properties in a mixture system 4-(2-methyloctanoyl) phenyl, 4-octyloxy benzoic acid ester obtained in Example 26 was mixed with 4-(2-methyloctanoyl)phenyl, 4-tetradecyloxy benzoic acid ester obtained in Example 27 at various mixing ratios to prepare a phase diagram, which was shown in FIG. 1.

As seen from this diagram, although 4-(2-methyloctanoyl) phenyl, 4-octyloxy benzoic acid ester exhibited chiralsmectic C phase only at a narrow temperature region and 4-(2-methyloctanoyl) phenyl, 4-tetradecyloxy benzoic acid ester did not exhibit chiralsmectic C phase during the cooling at −2° C./min, when both esters were mixed, particularly at a ratio of 80 mol% of the former to 20 mol% of the latter, the mixture exhibited chiralsmectic C phase at a wide temperature region of 19°∼4° C. and also the temperature thereof lowered.

EXAMPLE 54

Evaluation of liquid crystal properties in a mixture system 4-(2-methyloctanoyl) phenyl, 4-tetradecyloxy benzoic acid ester obtained in Example 27 was mixed with (+)-4-decanoyloxy benzoic acid-4-(2-methyloctanoyl) phenyl ester obtained in Example 29 at various mixing ratios to prepare a phase diagram, which was shown in FIG. 2.

As seen from this diagram, chiralsmectic C phase became considerably enlarged and the temperature thereof was lowered.

EXAMPLE 55

Evaluation of liquid crystal properties in a mixture system 4-(2-methyloctanoyl) phenyl, 4-octyloxy benzoic acid ester obtained in Example 26 was mixed with 4-decanoyloxy benzoic acid-4-(2-methyloctanoyl) phenyl obtained in Example 29 at various mixing ratios to prepare a phase diagram, which was shown in FIG. 3.

As seen from this diagram, chiralsmectic C phase became considerably enlarged and the temperature thereof was lowered.

As apparent from these results, the temperature and range capable of taking the liquid crystal can be changed by mixing at least two liquid crystals.

Industrial Applicability

The compounds according to the invention are excellent in the stability against light and the like and can take a liquid crystal state at a wide temperature range. Particularly, these compounds form liquid crystals of ferroelectricity having a large spontaneous polarization and a fast response rate by introducing an optically active group into the compound. They develop a very excellent effect as a starting material for optoelectronics and its related elements.

Therefore, it can be said that the compounds according to the invention are liquid crystal materials suitable for optoelectronics and its related elements utilizing liquid crystal properties or electro-chemichromism, for example, a display for liquid crystal television receiver, optical printer head, opto-Fourier transform element, light valve and the like.

We claim:

1. An optically active alkanoyl ester of the formula

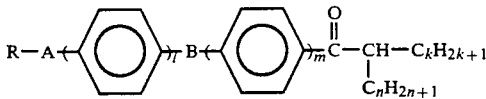

wherein A is any of a single bond,

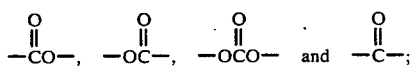

B is

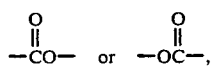

$e$ and $m$ are 1 or 2 with the proviso that they are not 2 simultaneously, $k$ and $n$ are integers of 2-16 and 1-4, respectively, with the proviso that $k > n$, and R is $C_1$-$C_{18}$ alkyl.

2. A liquid crystal composition containing an alkanoyl ester of claim 1.

3. The alkanoyl ester of claim 1, which is 4-(2-methyloctanoyl)phenyl, 4'-nonylbiphenyl-4-carboxylic acid ester.

* * * * *